US006651467B1

(12) United States Patent
Weinerman et al.

(10) Patent No.: US 6,651,467 B1
(45) Date of Patent: Nov. 25, 2003

(54) T-HANDLE OPERABLE ROTARY LATCH AND LOCK

(75) Inventors: Lee S. Weinerman, Medina, OH (US); Scott A. Arthurs, Brunswick, OH (US)

(73) Assignee: The Eastern Company, Cleveland, OH (US)

( * ) Notice: Subject to any disclaimer, the term of this patent is extended or adjusted under 35 U.S.C. 154(b) by 215 days.

(21) Appl. No.: 09/686,295

(22) Filed: Oct. 11, 2000

(51) Int. Cl.[7] ............................................ B60R 25/02
(52) U.S. Cl. ................... 70/208; 292/216; 292/DIG. 31
(58) Field of Search ............ 70/208–210; 292/DIG. 31, 292/216

(56) References Cited

U.S. PATENT DOCUMENTS

| | | | | |
|---|---|---|---|---|
| D119,418 | S | 3/1940 | Anderson et al. | D50/5 |
| 2,735,706 | A | 2/1956 | Pelcin | 292/34 |
| 3,209,564 | A | 10/1965 | Pelcin | 70/148 |
| D210,152 | S | 2/1968 | Pastva | D50/5 |
| D210,153 | S | 2/1968 | Pastva | D50/5 |
| D230,132 | S | 1/1974 | Pastva | D8/6 |
| 4,116,027 | A | 9/1978 | Tannery | 70/472 |
| 4,131,002 | A | 12/1978 | Gianelo | 70/84 |
| 4,312,203 | A | 1/1982 | Davis | 70/472 |
| 4,320,642 | A | 3/1982 | Pastva, Jr. | 70/472 |
| 4,370,874 | A | 2/1983 | Munn | 70/204 |
| 4,420,954 | A | 12/1983 | Hieronymi et al. | 70/150 |
| 4,438,964 | A | 3/1984 | Peters | 292/216 |
| 4,634,161 | A | 1/1987 | Fukasawa et al. | 292/336.3 |
| 4,706,478 | A | 11/1987 | Swan et al. | 70/208 |
| 4,707,006 | A | 11/1987 | Garg et al. | 292/336.3 |
| 4,838,054 | A | 6/1989 | Weinerman et al. | 70/208 |
| 4,838,056 | A | 6/1989 | Weinerman et al. | 70/208 |
| 4,841,755 | A | 6/1989 | Weinerman et al. | 70/208 |
| 4,850,208 | A | 7/1989 | Weinerman et al. | 70/208 |
| 4,850,209 | A | 7/1989 | Weinerman et al. | 70/208 |
| D303,617 | S | 9/1989 | Russell et al. | D8/306 |
| D303,618 | S | 9/1989 | Russell et al. | D8/306 |
| D303,619 | S | 9/1989 | Russell et al. | D8/313 |
| D303,620 | S | 9/1989 | Russell et al. | D8/313 |
| D303,621 | S | 9/1989 | Russell et al. | D8/313 |
| D303,922 | S | 10/1989 | Russell et al. | D8/321 |
| D304,155 | S | 10/1989 | Russell et al. | D8/303 |
| 4,896,906 | A | 1/1990 | Weinerman et al. | 292/48 |
| 4,911,487 | A | 3/1990 | Rachocki | 292/216 |
| 4,917,412 | A | 4/1990 | Swan et al. | 292/48 |
| 4,951,486 | A | 8/1990 | Braun et al. | 70/208 |
| 4,969,916 | A | 11/1990 | Weinerman et al. | 70/208 |
| D314,131 | S | 1/1991 | Russell et al. | D8/321 |
| 4,989,907 | A | 2/1991 | Edmonds et al. | 292/223 |
| 5,042,853 | A | 8/1991 | Gleason et al. | 292/126 |
| 5,046,340 | A | 9/1991 | Weinerman et al. | 70/208 |
| 5,058,937 | A | 10/1991 | Miehe et al. | 292/34 |
| 5,069,491 | A | 12/1991 | Weinerman et al. | 292/48 |
| D323,776 | S | 2/1992 | Hansen | D8/338 |
| D328,231 | S | 7/1992 | Hansen | D8/301 |

(List continued on next page.)

*Primary Examiner*—Suzanne Dino Barrett
(74) *Attorney, Agent, or Firm*—David A. Burge

(57) ABSTRACT

A slam-capable, T-handle operated rotary latch has a pan-shaped housing for nesting the T-handle and employs a single rotary jaw that is releasably retained in its latched. position by a rotary pawl. The latch has spaced first and second side plates that sandwich the rotary jaw, the rotary pawl and a torsion spring that biases the jaw toward an open position. The pawl defines a release trigger which, when tripped, permits the jaw to be pivoted by the torsion spring to an open position. A compact arrangement of stop formations and independently pivotal operating arms is provided adjacent a backwall of the housing to enable the T-handle to trip the release trigger during forward pivoting of the T-handle and the operating arms in opposition to the action of a return spring, and to limit reverse pivotal movement of the operating arms and the T-handle under the influence of the return spring.

30 Claims, 12 Drawing Sheets

U.S. PATENT DOCUMENTS 5,127,686 A 7/1992 Gleason et al. ............ 292/216
D339,050 S 9/1993 Gleason et al. ............ D8/301
5,299,844 A 4/1994 Gleason .................... 292/240
D346,731 S 5/1994 Larsen et al. .............. D8/301
5,413,391 A 5/1995 Clavin et al. .............. 292/170
5,439,260 A 8/1995 Weinerman et al. .......... 292/48
5,484,178 A 1/1996 Sandhu et al. ............. 292/173
D369,084 S 4/1996 McConnell et al. .......... D8/302
D369,089 S 4/1996 Zenner .................... D8/343
5,526,660 A 6/1996 Bennett et al. ............ 70/208
D371,500 S 7/1996 McConnell et al. .......... D8/302
D373,298 S 9/1996 Miehe et al. .............. D8/302
5,564,295 A 10/1996 Weinerman ................ 70/208
5,586,458 A 12/1996 Weinerman et al. ......... 70/208
5,606,882 A 3/1997 Larsen et al. .............. 70/369
5,611,224 A 3/1997 Weinerman et al. .......... 70/208
D383,664 S 9/1997 Bennett ................... D8/331
D390,086 S 2/1998 Weinerman et al. .......... D8/306
D394,373 S 5/1998 Weinerman et al. .......... D8/306
5,820,174 A 10/1998 Parikh et al. ............ 292/126
5,820,175 A 10/1998 Clavin .................. 292/165
5,884,948 A 3/1999 Weinerman et al. .......... 292/216
D410,424 S 6/1999 Hansen .................... D12/196
D410,609 S 6/1999 Hansen .................... D12/196
5,927,772 A 7/1999 Antonucci et al. .......... 292/336.3
5,927,773 A 7/1999 Larsen et al. .............. 292/337
5,941,104 A 8/1999 Sadler .................... 70/208
5,983,682 A 11/1999 Parikh ................... 70/208
5,984,383 A 11/1999 Parikh et al. ............ 292/121
5,987,943 A 11/1999 Verga et al. ............. 70/208
5,992,908 A 11/1999 Yared et al. ............. 292/196
D417,555 S 12/1999 Yared et al. ............. D6/306
D419,421 S 1/2000 Larsen et al. .............. D8/306
6,023,953 A 2/2000 Vickers et al. ............. 70/208
6,145,352 A 11/2000 Vickers et al. ............ 70/208
6,454,321 B1 9/2002 Parikh .................... 292/216

T-HANDLE OPERABLE ROTARY LATCH AND LOCK

BACKGROUND OF THE INVENTION

1. Field of the Invention

The present invention relates to a novel and improved slam-capable, flush-mountable, T-handle operated rotary latch assembly connected to rear portions of a pan-shaped housing, with a pair of pivotal operating arms that rotate together with the T-handle in a forward direction of rotation to operate or "unlatch" the latch, wherein the operating arms engage stops defined adjacent a backwall of the housing to limit reverse direction rotation of the operating arms and the T-handle, and wherein a key operated lock may be provided to retain the operating arms in their non-operated positions. More particularly, the present invention relates to a T-handle operated rotary latch unit of the type described that preferably employs a rotary latch assembly of the type having a single rotary jaw that is releasably retained in its latched position by a rotary pawl, with the latch having spaced first and second housing side plates that sandwich the rotary jaw, the rotary pawl and a torsion spring that biases the jaw toward an open position, with the side plates defining aligned first and second U-shaped notches that cooperate with a third U-shaped notch formed in the rotary jaw to concurrently receive and to latchingly retain a suitably configured strike formation, and with one of the housing side plates being rigidly connected to the pan-shaped housing by at least a tab-like formation that overlies the backwall and defines one of the stops, wherein pivotal movement of the operating arms trips a release trigger of the pawl in response to operation of the T-handle to permit the rotary jaw to be pivoted by the torsion spring to an open position.

2. Prior Art

Flush mountable, paddle handle operated latches and locks are known that employ rotary latch bolts, also referred to as "rotary jaws," wherein the jaws are provided with U-shaped strike-receiving notches for latchingly receiving and releasably retaining suitably configured strike formations. It also is known to utilize a spring-biased operating arm that is pivotally connected to a back wall of a pan-shaped housing to transfer unlatching movement from a rearwardly extending projection of a housing-pivoted paddle handle to a rotary latch assembly that is connected to the pan-shaped housing, as is exemplified by U.S. Pat. No. 5,586,458 issued Dec. 24, 1996 to Lee S. Weinerman et al, entitled HANDLE OPERABLE ROTARY LATCH AND LOCK, and U.S. Pat. No. 4,320,642 issued Mar. 23, 1982 to John V. Pastva, Jr., entitled PADDLE LOCKS WITH HANDLE DISCONNECT FEATURES, the disclosures of which are incorporated herein by reference.

Other disclosures of latch and/or lock units that employ rotary jaws are found in U.S. Pat. No. 4,320,642 issued Mar. 23, 1982 to. John V. Pastva, Jr., entitled PADDLE LOCKS WITH HANDLE DISCONNECT FEATURES; U.S. Pat. No. 4,917,412 issued Apr. 17, 1990 to Jye P. Swan et al, entitled VEHICLE DOOR LOCK SYSTEM PROVIDING A PLURALITY OF SPACED ROTARY LATCHES; U.S. Pat. No. 4,896,906 issued Jan. 30, 1990 to Lee S. Weinerman et al entitled VEHICLE DOOR LOCK; and, U.S. Pat. No. 5,069,491 issued Dec. 3, 1991 to Lee S. Weinerman et al entitled VEHICLE DOOR LOCK SYSTEM. The disclosures of these patents also are incorporated herein by reference.

The rotary latch and/or lock units that are disclosed in the four patents identified just above are of a relatively heavy duty type that often are employed in "personnel restraint applications," typically on doors of passenger compartments of vehicles. These heavy duty units employ pairs of lousing-mounted rotary jaws, with the jaws being sandwiched between pairs of housing side plates, and with notches that are formed in each pair of rotary jaws being configured to receive and engage opposite sides of a suitably configured strike formation, typically a cylindrical stem of a striker pin. While both of the housing side plates are provided with U-shaped notches, neither of these notches defines a strike engagement surface that cooperates with a notched rotary jaw to latchingly receive and releasably. retain a strike formation. The notches that are formed in the jaws, not the notches that are formed in the housing side plates, receive, engage and latchingly retain suitably configured strike formations.

Lighter duty rotary latch and lock units that employ single rotary jaws also are known, as exemplified by the following: U.S. Pat. No. 5,884,948 issued Mar. 23, 1999 to Lee S. Weinerman et al, entitled ROTARY LATCH AND LOCK; U.S. Pat. No. 5,611,224 issued Mar. 18, 1997 to Lee S. Weinerman et al, entitled HANDLE OPERABLE ROTARY LATCH AND LOCK; U.S. Pat. No. 5,586,458 issued Dec. 24, 1996 to Lee S. Weinerman et al, entitled HANDLE OPERABLE ROTARY LATCH AND LOCK; U.S. Pat. No. 5,564,295 issued Oct. 15, 1996 to Lee S. Weinerman et al, entitled HANDLE OPERABLE ROTARY LATCH AND LOCK; U.S. Pat. No. 5,439,260 issued Aug. 8, 1995 to Lee S. Weinerman et al, entitled HANDLE OPERABLE ROTARY LATCH AND LOCK; and, U.S. Pat. No. 4,312,203 issued Jan. 26, 1982 to Edwin W. Davis entitled FLUSH-MOUNTABLE LOCK WITH ACTUATOR DISCONNECT FEATURE.

While flush-mountable T-handle operated latch and lock mechanisms of various types are known, as is shown by U.S. Pat. No. 4,706,478 issued Nov. 17, 1987 to Jye P. Swan et al, entitled ROTARY HANDLE OPERATED DOOR LOCK, and while T-type operating handles are sometimes preferred over paddle-type operating handles in some applications, relatively little has been done until now to provide flush mountable, T-handle operated rotary latch assemblies that can be substituted for paddle handle operated rotary latch assemblies.

Although considerable thought has been devoted during recent years to providing improved, more compact and highly reliable handle-to-latch interconnection mechanisms in paddle handle operated rotary latches, it has seldom been possible to make much use of the resulting improvements in T-handle operated rotary latches. One of the reasons why improvements made in the handle-to-latch interconnection mechanisms of paddle handle operated rotary latches tend to be unsuitable for use in the handle-to-latch interconnection mechanisms of T-handle operated rotary latches has to do with the very different way in which paddle handles and T-handles connect to and pivot with respect to their associated pan-shaped flush mountable housings.

Whereas paddle handles execute a simple pivoting action about axes that parallel the back walls of their associated housings when moving between their non-operated and operated positions, T-handles ordinarily accomplish no unlatching movement at all when they pivot between their nested and extended positions about axes that substantially parallel the back walls of their associated housings; rather, they accomplish unlatching only when pivoted about axes that extend substantially perpendicular to the back walls of their associated housings. This very basic difference in the character and operation of the two types of handles has necessitated the use of very different handle-to-latch interconnection mechanisms on paddle-handle operated and T-handle operated rotary latch and lock units.

SUMMARY OF THE INVENTION

The present invention provides a slam-capable, flush-mountable, T-handle-operated, single-jaw rotary latch assembly having a jaw-retaining rotary pawl with an associated "trigger" that can be tripped to "unlatch" the rotary latch by a compact arrangement of two independently movable operating arms that pivot in a forward direction alongside a back wall of the housing for executing an "unlatching" movement in response to movement of the T-handle from its non-operated position to its operated position, with a compact arrangement of stops being provided adjacent the back wall for limiting the pivotal return movement of the operating arms and the T-handle as these three components return to their non-operated positions.

One feature of the invention resides in the provision of first and second independently movable operating arms that pivot alongside the back wall of a pan-shaped housing to drivingly connect a T-handle to a rotary latch assembly to operate, trip or unlatch the rotary latch assembly in response to pivotal movement of the T-handle from a non-operated position to an operated position. The first operating arm is relatively short and is rigidly connected to a stub shaft that is pivotally connected to the housing and carries the T-shaped grip of the operating handle. This first arm typically pivots through about a quarter-turn of movement—a range of usually about thirty degrees—when the T-handle is pivoted between the non-operated and operated positions. The second operating arm is relatively long, is pivotally connected to the back wall of the housing, and typically pivots through a much smaller range of movement—usually about fifteen degrees—to trip, operate or unlatch the rotary latch assembly by moving a trigger formation of the rotary latch assembly. The use of a pair of operating arms that cooperate in this manner, are of significantly different lengths and pivot through significantly different ranges of movement to provide the heart of a very compact and reliable handle-to-latch interconnection mechanism provides one feature of note.

Another feature resides in the manner in which stops are provided in a compact and reliable way to limit the return pivotal movement of not only the two operating arms but also the T-handle—movement that takes place as the result of the biasing action of a spring that is interposed between the housing and the second, relatively long operating arm. A return movement stop for the first, relatively short operating arm is provided by a formation of the first operating arm that is configured to engage a tab-like extension of one of the side plates of the rotary latch assembly—an extension that overlies the back wall of the housing and is rigidly connected thereto to at least assist in mounting the rotary latch assembly on the pan-shaped housing. The use of a tab-like mounting formation of a rotary latch assembly to perform a second duty of providing a return movement stop for an operating arm that is connected to a T-handle (and therefore also serves to stop return pivotal movement of the T-handle) provides another feature of note.

Still another feature resides in the use of a formation of the first operating arm to stop the return pivotal movement of the second operating arm. Contemplated within the possibilities provided by this option are: 1) the use of engaged driving formations provided at distal ends of both of the operating arms to stop the return pivotal movement of the second operating arm; or 2) the provision of a stop surface at a "hub" end of the first operating arm (adjacent the pivot axis of the first operating arm and adjacent a location of connection between the first operating arm and a stub shaft that carries the graspable T-shaped component of the T-handle) that is engaged by the second operating arm to stop the return pivotal movement of the second operating arm (an arrangement that can be utilized, if desired, to halt the return movement of the second operating arm before halting the return movement of the first operating arm); or, 3) the concurrent use of both of these types of stops (whereby spaced portions of the second operating arm engage spaced portions of the first operating arm to stop the return pivotal movement of the second operating arm at the same time that return pivotal movement of the first operating arm is stopped), in applications where dual-stop contact between the operating arms and concurrent stoppage of the movement of both operating arms may be desired.

Stating one feature of the invention in another way, while the stop that is defined by the tab-like extension of one of the side plates of the rotary latch assembly may effectively serve to limit the pivotal movement of both of the operating arms and the T-handle as these members pivot to their non-operated positions, a second stop defined by the first operating arm may be engaged by the second operating arm to independently halt the return pivotal movement of the second operating arm.

In preferred practice, the stop that is defined by the tab-like extension of one side plate of the rotary latch assembly serves to stop the return rotation of both of the operating arms. Where this preferred arrangement is employed, a single spring interposed between the housing and the second operating arm can be used to bias both of the operating arms into engagement with their respective stops to limit the return pivotal movement of the first and second operating arms and the T-handle when these three pivotal elements reach their non-operated positions.

While the preferred practice of the present invention calls for the use of rotary latch assemblies of the type disclosed in U.S. Pat. No. 5,586,458, it is contemplated that features of the invention including its advantageous arrangement of dual operating arms and their associated return-movement stops can be utilized with other types of rotary latch assemblies that are adapted by providing one of their housing side plates with a tab-like extension that overlies and is connected to a housing back wall at a location wherein the tab-like extension can serve dual duty as a mount for connecting the latch assembly to the back wall, and as a stop for limiting return pivotal movement of one of the operating arms that is connected to a T-handle, and therefore also serves to limit return pivotal movement of the T-handle.

BRIEF DESCRIPTION OF THE DRAWINGS

These and other features, and a fuller understanding of the invention may be had by referring to the following description and claims, taken in conjunction with the accompanying drawings, wherein:

DESCRIPTION OF THE PREFERRED EMBODIMENT

Figure 1:
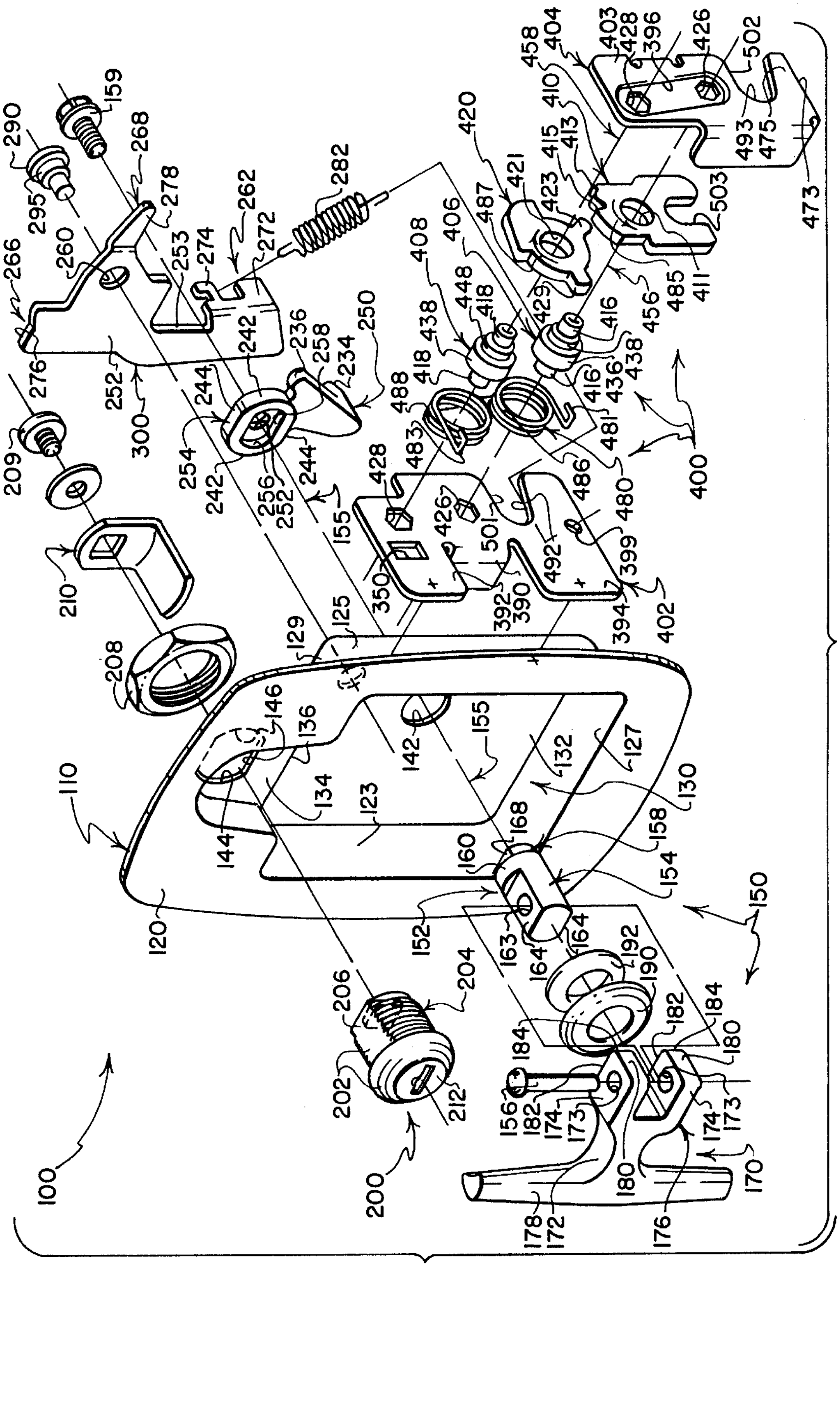
FIG. 1 is an exploded front perspective view of components of one embodiment of a T-handle operable rotary latch and lock unit that incorporates features of the present invention.

Referring to FIGS. 1–11, one embodiment of a T-handle operable rotary latch and lock unit embodying features of the present invention is indicated generally by the numeral 100. The unit 100 has a pan-shaped housing 110 onto which are mounted a T-handle type of operating handle 150, a key-operated cam lock assembly 200, first and second operating arms 250, 300, and a rotary latch assembly 400.

Figure 9:
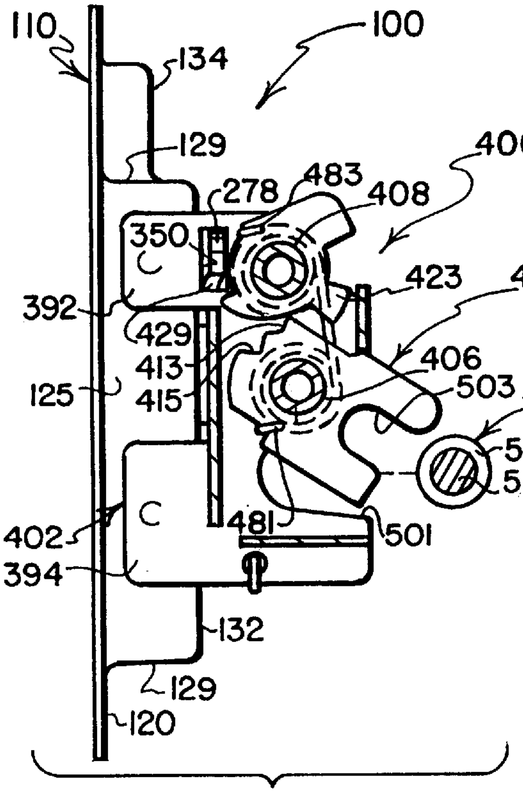
FIGS. 9, 10 and 11 are sectional views as seen generally from a plane indicated by a line A—A in FIG. 5, and are provided to schematically depict a sequence of three steps by which a suitably configured strike comes to be received in and latchingly retained by rotary latch components of the first embodiment, with FIG. 9 showing the latch "unlatched" and the strike not yet engaging the latch, with FIG. 10 showing the strike being received by the latch and showing a preliminary latching orientation of latch components, and with FIG. 11 showing a fully latched configuration of the strike and latch components.
Figure 10:
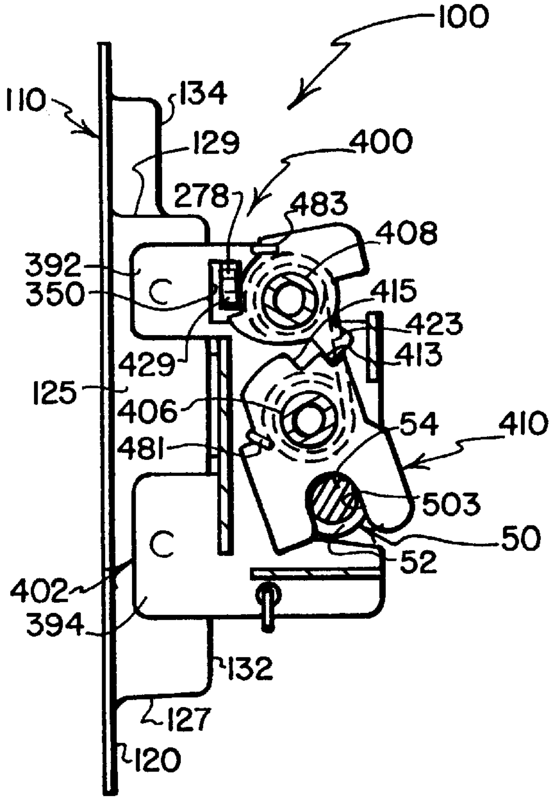
Figure 11:
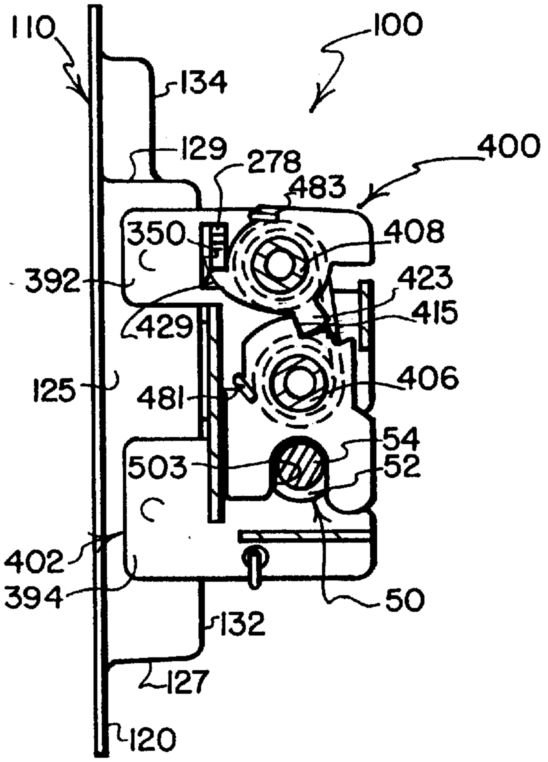

Referring to FIGS. 9–11, a typical strike that may be engaged by the latch and lock unit 100 is indicated generally by the numeral 50. As depicted, the strike 50 has an enlarged head 52 and a generally cylindrical formation of smaller diameter 54—which is what is engaged by the rotary latch assembly 400. The strike 50 is usually mounted on a door frame or other structure (not shown) that will be positioned adjacent the unit 100 when a closure (not shown) on which the unit 100 is mounted is in its closed position.

Referring to FIG. 1, the pan-shaped housing 110 is a generally rectangular metal stamping having a perimetrically extending, substantially flat mounting flange 120 which surrounds a forwardly facing recess 130. Opposed, parallel extending side walls 123, 125, and opposed, parallel extending end walls 127, 129 are joined by smooth bends to extend perimetrically around the recess 130, and are joined by smooth bends to the mounting flange 120.

A majority of the recess 130 is relatively deep, and is closed by a main back wall portion 132 that is substantially flat. One end region of the recess 130 is more shallow, and is closed by a minor back wall portion 134 that also is substantially flat. A portion 136 of the end wall 129 forms a transition between the back wall portions 132, 134. Smooth bends join the back wall portions 132, 134 to adjacent portions of the side and end walls 123, 125, 127, 129.

A main back wall opening 142 is formed through the main back wall portion 132. A lock mount opening 144 is formed through the minor back wall portion 134. The lock mount opening 144 is generally circular except for two flats 146 formed along opposite sides thereof. The main back wall opening 140 is circular and is located midway between the end walls 127, 129 while being spaced more closely to one of the side walls 123, 125 than to the other of the side walls, 123, 125. If the opening 140 is closer to the side wall 123 than to the side wall 125, the T-handle 150 folds toward the side wall 125 when being nested within the recess 130; and, if the opening 140 is closer to the side wall 125 than to the side wall 123, the T-handle folds toward the side wall 123 when being nested within the recess 130—by which arrangement so-called "left" and "right" versions of the unit 100 are defined.

The T-handle type of operating handle 150 includes a stub shaft 152 that extends along a pivot axis 155 through the main back wall opening 142. A T-shaped handgrip member 170 is situated on the front side of the back wall portion 132, and is pivotally connected to a front end region 154 of the stub shaft 152 by a pivot pin 156. The first operating arm 250 is rigidly connected to a rear end region 158 of the stub shaft 152 by a threaded fastener 159. The threaded fastener 159 extends through a hole 252 defined by a hub 254 located at one end region of the first operating arm 250, and is threaded into a hole (not shown) formed in the rear end region 158 of the stub shaft 152.

The stub shaft 152 has a central region 160 of cylindrical cross-section located between the front and rear end regions 154, 158. Flat surfaces 164 are formed on opposites of the front end region 154. A hole 163 is formed through the front end region 154 and opens at opposite ends through the flat surfaces 164. The axis of the hole 163 extends perpendicular to the planes of the parallel-extending flat surfaces 164.

Flat surfaces 168 (one of which is shown in FIG. 1) are formed on opposite sides of the rear end region 158 of the stub shaft 152. The hub 254 of the first operating arm 250 has an opening 256 configured to receive the rear end region 158 of the stub shaft 152. The opening 256 is defined, in part, by opposed flat surfaces 258 (one of which is shown in FIG. 1) that are configured to mate with the flat surfaces 168 on the rear end region 158 of the stub shaft 152, to establish a driving connection between the stub shaft 152 and the first operating arm 250 to ensure that the first operating arm 250 will pivot with the stub shaft 152 when the stub shaft is rotated about the pivot axis 155.

The T-shaped handgrip member 170 has an elongate centrally located stem 172 that connects at one end with a yoke 176, and at the other end with a crossbar 178. The yoke 176 has a pair of spaced, parallel extending legs 174, with aligned holes 173 extending therethrough. The pivot pin 156 extends through the yoke leg holes 173 and through the stub shaft hole 153 to pivotally connect the T-shaped handgrip member 170 to the stub shaft 152 for movement between a nested position (see FIGS. 5 and 7) and an extended position (see FIGS. 6 and 8). When the T-shaped handgrip member 170 is in its nested position, it is received within the recess 130 of the pan-shaped housing 110.

A driving connection is defined between the T-shaped handgrip member 170 and the stub shaft 152,by virtue of the yoke legs 174 extending closely alongside the flat surfaces 164 of the stub shaft 152, and by virtue of the pivot pin 156 extending through the holes 153, 173 of the yoke 176 and the front end region 154 of the stub shaft 152. This driving connection ensures that, when the T-shaped handgrip member 170 is in its extended position (see FIGS. 6 and 8) and is rotated about the pivot axis 155, the stub shaft 152 will rotate with the handgrip member 170. Because the T-shaped handgrip member 170 is closely received within the recess 130 of the pan-shaped housing 110 when nested, the T-shaped handgrip member 170 must be pivoted to its extended position in order for tile T-handle operating handle 150 to rotate about the axis 155 to pivot the first operating arm 250 between its non-operated position (best seen in FIG. 3) and its operated position (best seen in FIG. 4).

Figure 5:
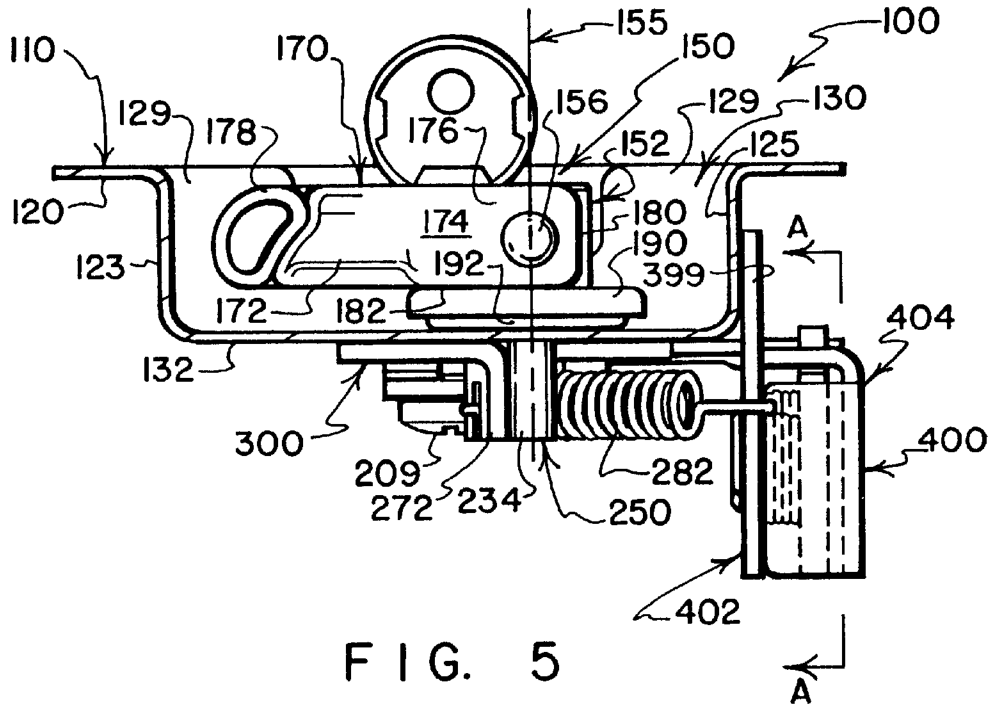
FIG. 5 is a sectional view as seen from a plane indicated by a line 5—5 in FIG. 3.
Figure 6:
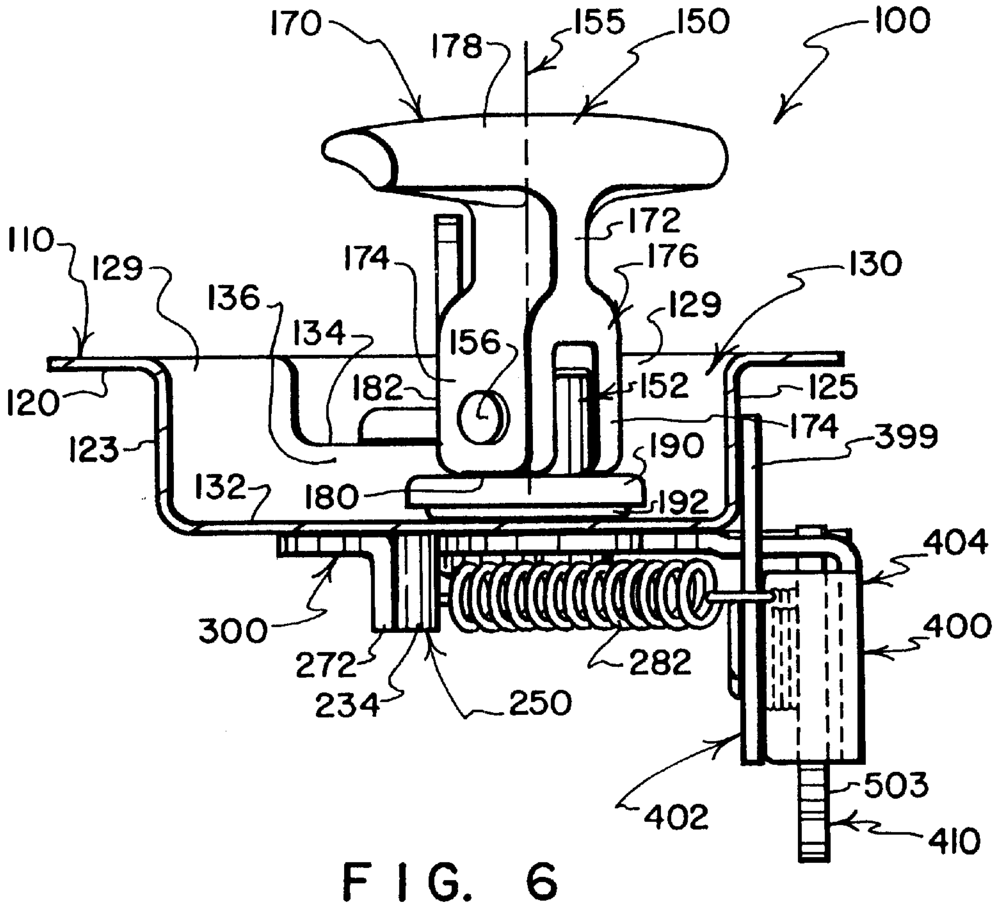
FIG. 6 is a sectional view as seen from a plane indicated by a line 6—6 in FIG. 4.

Referring to FIGS. 1, 5 and 6, flat surfaces 180 are defined at the base of the yoke legs 174. Flat surfaces 182 also are defined along one side of the yoke legs 174. When the T-shaped handgrip member 170 is nested (as shown in FIG. 5), an escutcheon washer 190 carried on the front end region 154 of the stub shaft 152 is biased into engagement with the flat surfaces 180 by a spring washer 192 that is interposed between the escutcheon washer 190 and the back wall portion 132 of the housing 110. When the T-shaped handgrip member 170 is extended (as shown in FIG. 6), the escutcheon washer 190 is biased by the spring washer 192 into engagement with the flat surfaces 182. When the T-shaped handgrip member 170 is pivoted between its nested and extended positions, rounded surfaces 184 that connect the flat surfaces 180 with the flat surfaces 182 compress the escutcheon washer 190 toward the back wall 132 of the housing 110 in opposition to the action of the spring washer 192. This interaction between the flat surfaces 180, 182, the rounded surfaces 184, the escutcheon washer 190 and the spring washer 192 serve to detent the T-shaped handgrip member 170 toward its nested and extended positions, as is well understood by those who are skilled in the art inasmuch as this manner of detenting is commonly used with foldable T-handles that are nestable within pan-shaped housings.

Figure 3:
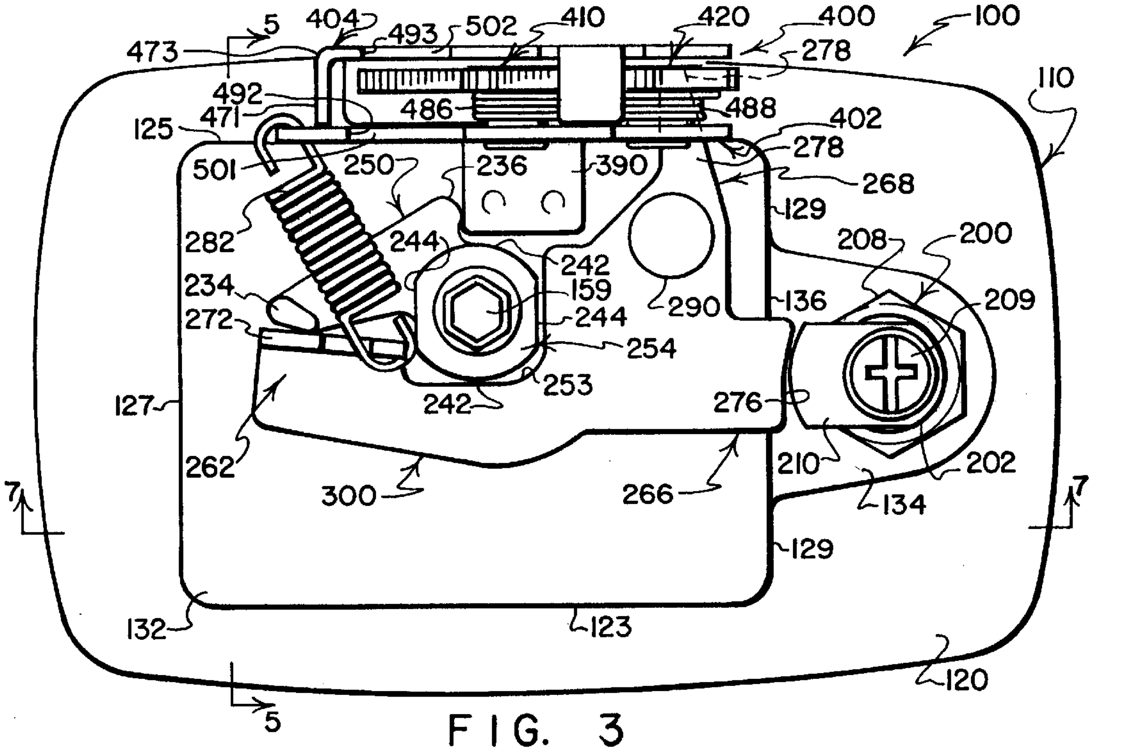
FIG. 3 is a rear elevational view thereof.
Figure 4:
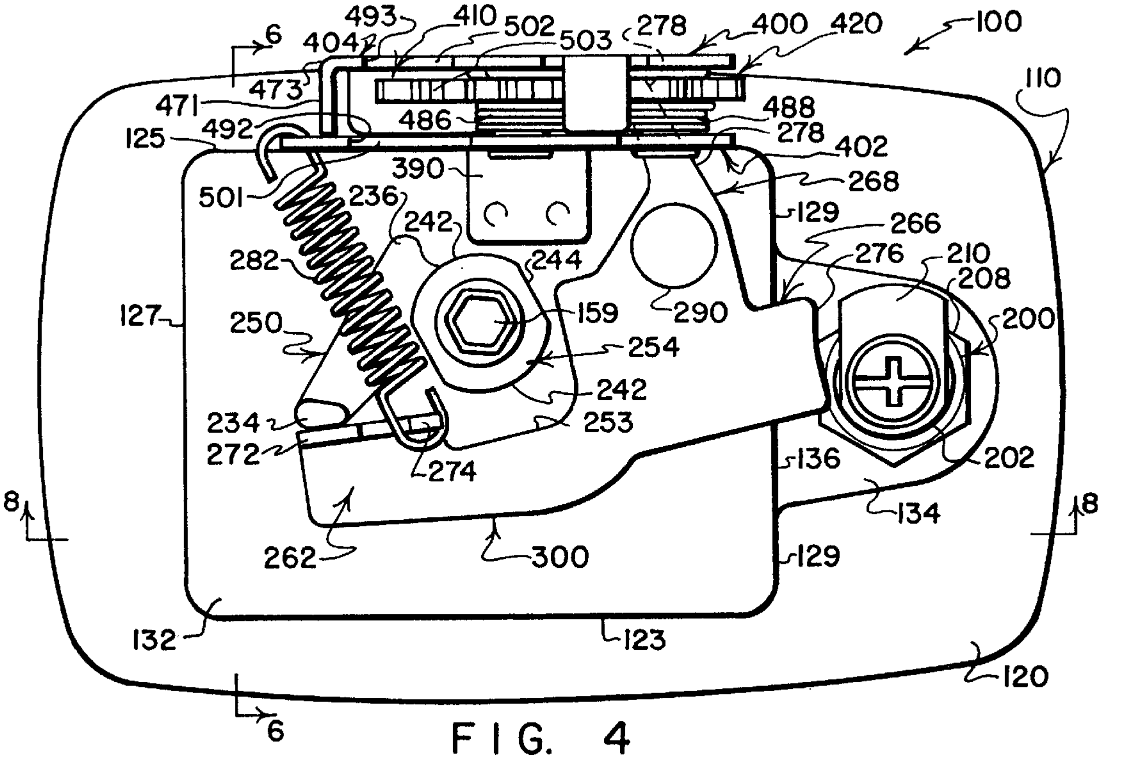
FIG. 4 is a rear elevational view similar to FIG. 3 but with the locking cam in an unlocked position, and with other components moved in response to movement of the T-shaped operating handle to its operated position, namely with the first and second operating arms shown in their operated positions causing the the rotary pawl to move to "unlatch" the rotary jaw, and with the rotary jaw in an unlatched position.
Figure 7:
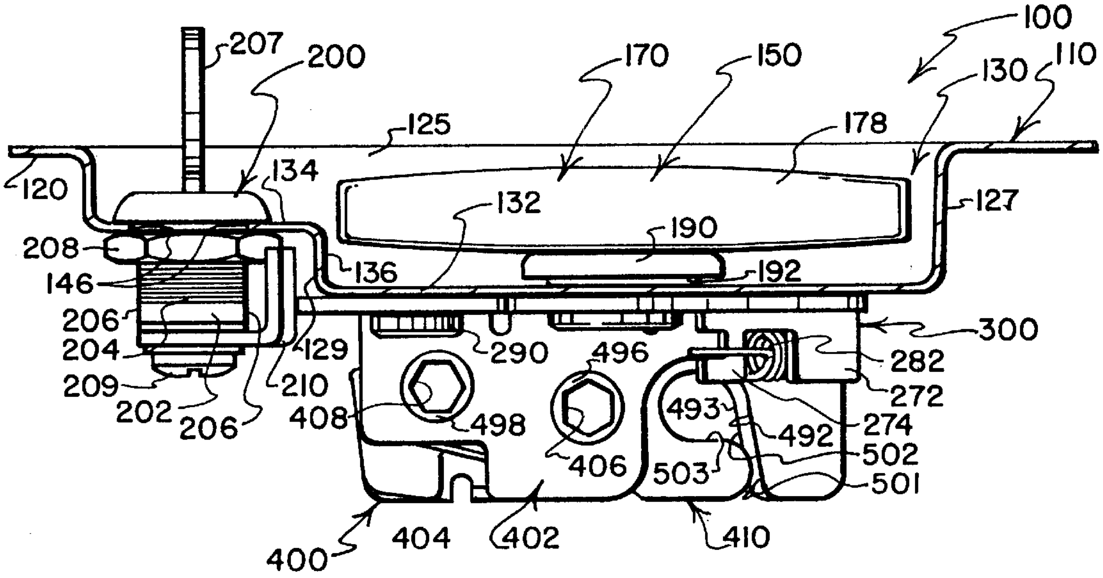
FIG. 7 is a sectional view as seen from a plane indicated by a line 7—7 in FIG. 3.
Figure 8:
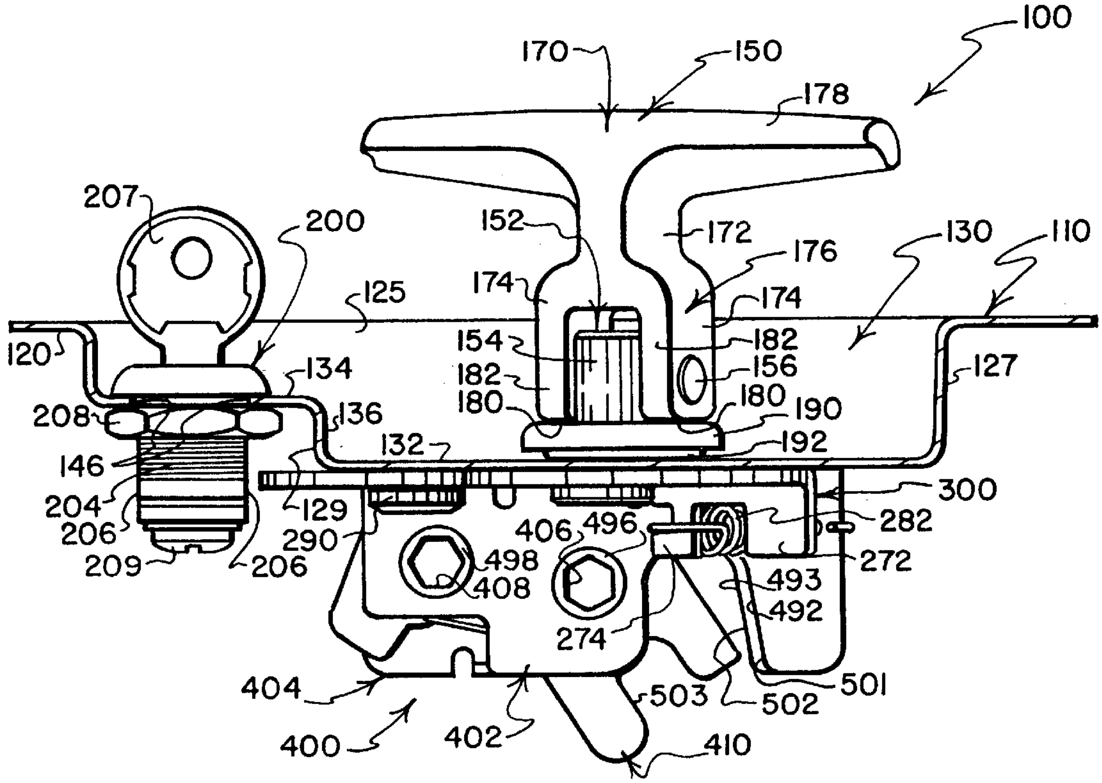
FIG. 8 is a sectional view as seen from a plane indicated by a line 8—8 in FIG. 4.

When the operating handle 150 is pivoted about the axis 155 of the shaft 152 away from its normal non-operated position, shown in FIGS. 5 and 7 to its operated position, shown in FIGS. 6 and 8, the first operating arm 250 is caused to move from its non-operated position, shown in FIG. 3, to its operated position, shown in FIG. 4. When the first operating arm 250 moves from its non-operated to its operated position, it engages and pivots the second operating arm 300 from its non-operated position, shown in FIG. 3, to its operated position, shown in FIG. 4, to “unlatch” the rotary latch sub-assembly 400 from latchingly engaging a suitably configured strike formation 50 (see FIGS. 7–9).

Figure 2:
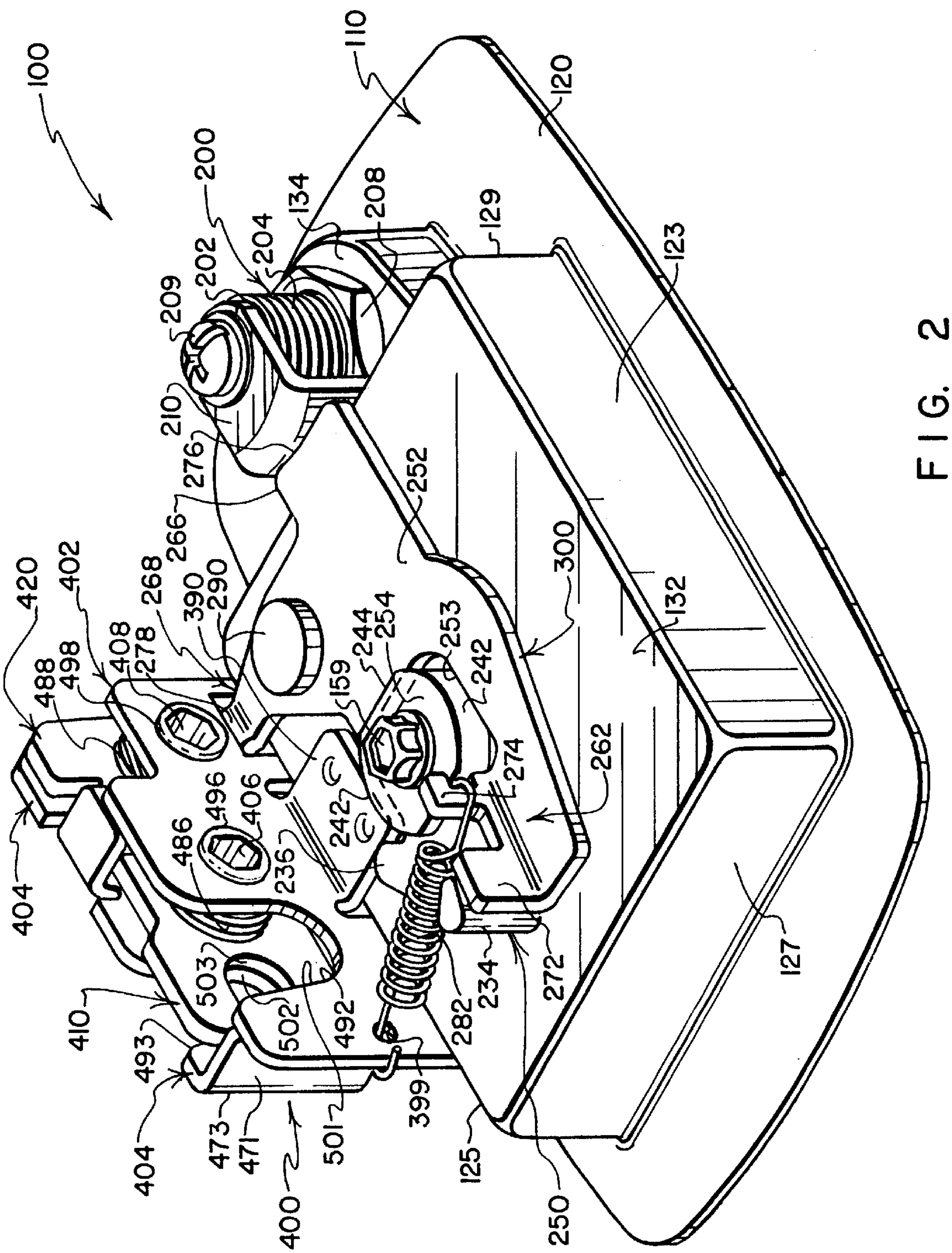
FIG. 2 is a rear perspective view thereof, on an enlarged scale, showing the unit with its components assembled, with its rotary jaw in a latched position, with its first and second operating arms in their non-operated positions, and with its locking cam in a locked position—which necessitates that the T-shaped operating handle of the unit be in its non-operated position.

Referring to FIGS. 1–6, the key-operated lock mechanism 200 is a commercially purchased item that has a generally tubular body 202 that carries threads 204, with opposite side portions defining flat surfaces 206 (one of which is shown in FIG. 1). The housing 202 is received in the lock mounting opening 144, with the flat surfaces 206 engaging the flats 146 to prevent the body 202 from rotating relative to the housing 110. A nut 208 is tightened on the threads 204 to mount the body 202 on the housing 110. Carried within the tubular body 202 is a key-operated rotatable plug 212 that carries a cam 210 at a location spaced rearwardly from the tubular housing 202. The cam 210 is held in place by a threaded fastener 209. The cam 210 is movable between a “locked” position, as depicted in FIGS. 2, 3 and 5, and an “unlocked” position, as depicted in FIGS. 4 and 6. Movement of the cam 210 between its locked and unlocked positions is effected by inserting a key 207 into the plug 212, and by turning the key between the unlocked position, as depicted in FIGS. 3 and 5, and the locked position, as depicted in FIGS. 6 and 8.

Referring to FIGS. 1–4, the first operating arm 250 has a relatively flat, generally triangular shape except for the hub 252 which is located at one of the corner regions of the triangle, except for a rearwardly extending driving formation 234 which is located at another of the corner regions of the triangle, and except for a rounded stop surface 236 which is defined at the third corner of the triangle. The hub 252 has a rounded outer surface 242 that is interrupted by the provision of flat surfaces 244 on opposite sides thereof. The driving formation 234 has something of a round-cornered trapezoidal cross-section that engages a rearwardly turned driving formation 272 of the second operating arm 300. The rounded stop surface 238 is configured to engage a tab-like extension 390 of a side plate 402 of the rotary latch 400 when the first operating arm 250 (and hence the operating handle 150) is in its non-operated position, as depicted in FIGS. 2 and 3.

Referring to FIGS. 1–4, the second operating arm 300 has a more complex configuration than the first operating arm 250. The second operating arm 300 is formed as a one-piece stamping that has a generally flat main portion 252 which defines a mounting hole 260 (see FIG. 1), and "regions" 262, 266, 268 that are provided to connect the operating arm 300 with other components.

The connection region 262 includes the rearwardly turned driving formation or flange 272 which is engaged by the rearwardly extending driving formation 234 of the first operating arm 250. The connection region 262 also includes a small rearwardly turned formation 274. A tension coil spring 282 connects with the formation 274 and with a hole 399 formed through the side plate 402 of the latch assembly 400 to bias the second operating arm 300 away from its operated position (see FIG. 4) toward its non-operated position (see FIGS. 2 and 3).

The connection region 266 includes a surface 276 that is engaged by the cam 210 when the key-operated lock 200 positions the cam 210 in its locked position (shown in FIGS. 2, 3 and 5), but that is disengaged by the cam 210 when the key-operated lock 200 positions the cam 210 in its unlocked position (shown in FIGS. 4 and 6).

Tile connection region 268 also includes a pawl-engaging formation 278 for transferring "unlatching" movement to a rotary pawl 420 of the rotary latch assembly 400, as will be explained shortly. The pawl-engaging formation 278 extends through a slot 350 formed in a housing side plate 402 of the rotary latch assembly 400. By this arrangement, and by sizing the slot 350 so that it relatively closely receives the pawl-engaging formation 278—to aid in guiding movements of the second operating arm 300, and in supporting the second operating arm 300 to resist deformation of the second operating arm 300 during applications of undue force to the latch and lock unit 100.

A shoulder rivet 290 (or other suitable fastener) is rigidly connected to the main back wall portion 132 of the pan-shaped housing 110, and provides a central diameter 295 (see FIG. 1) that is received in a slip fit within the mounting hole 260 of the mounting arm 250—to mount the second operating arm 300 on the housing 110 for pivotal movement relative thereto about the axis of the rivet 290.

Referring to FIG. 1, the latch assembly 400 has what will be referred to as a "housing" that consists of first and second "housing side plates" 402, 404 that are held together by two identical spacers or bushings 406, 408 that extend along transverse axes 456, 458.

The housing side plate 402 is substantially flat except for a centrally located tab-like extension that defines the mounting tab 390. The tab-like extension or tab 390 extends substantially perpendicular to the plane of other portions of the housing side plate 402 at a location spaced between two other mounting tabs 392, 394. The tab 390 overlies and is welded to a portion of the back wall 132 of the housing 110. The tabs 392, 394 overlie and are welded to portions of the side wall 125 of the housing 110.

The housing side plate 404 is substantially flat except 1) for an elongate recess 396 stamped therein, 2) for a pair of transversely extending flanges 471 (see FIG. 2) and 472 (see FIG. 1) are joined by small radius bends to the main flat portion 403 of the side plate 404.

Referring to FIG. 1, the bushings or spacers 406, 408 are tubular (i.e., they have hollow interiors), and have reduced diameter end regions 416, 418 that are sized to be received in a slip fit within hex-shaped holes 426, 428 that are formed in the flat central portions 401, 403 of the side plates 402, 404, respectively. To securely retain the hollow, reduced diameter end regions 416, 418 in place within the hex-shaped holes 426, 428 (to thereby rigidly interconnect the housing side plates 402, 404), the end regions 416, 418 are expanded within the hex-shaped holes 426, 428 (see FIG. 2) to fully engage the sides of the hex-shaped holes 426, 428. Because the holes 426, 428 are hex-shaped, and because the hollow end regions 416, 418 are expanded to fully fill the hex-shaped holes 426, 428, good, secure, rotation resistant connections are formed that rigidly interconnect the side plates 402, 404 and that resist loosening and rotation of the bushings 406, 408 relative to the side plates 402, 404.

Referring still to FIG. 1, the bushings 406, 408 are generally cylindrical, and provide stepped central regions that have relatively large diameter portions 436, 438 and relatively medium diameter portions 446, 448, respectively. The end and central regions 416, 436, 446 of the bushing 406 are concentric about the transversely extending axis 456. The end and central regions 418, 438, 448 of the bushing 408 are concentric about the transversely extending axis 458. Optional internal threads (not shown) may be formed within hollow interiors of the bushings 406, 408 to permit threaded fasteners of suitable size (not shown) to be connected to the subassembly 400 (should this be desirable for some purpose).

Referring to FIGS. 1 and 2, the side plates 402, 404 define aligned first and second U-shaped notches 501, 502, respectively, that open rearwardly with respect to a closure (not shown) on which the unit 100 is mounted so that, as the closure is moved toward its closed position, the resulting rearward movement of the side plates 402, 404 by the closure will cause the central region 56 of the strike 50 to be received within the first and second U-shaped notches 501, 502 (see FIGS. 9–11). Referring to FIGS. 1, 2, 7 and 9, a cooperating third U-shaped notch 503 is formed in the rotary jaw 410, and functions in concert with the first and second U-shaped notches 501, 502 to receive and latchingly retain the central region 56 of the strike 50 (shown in FIGS. 9–11) therein when the closure that mounts the unit 100 is closed.

The second U-shaped notch 502 (either alone or in concert with the first U-shaped notch 501) to define a strike engagement surface (or surfaces) that is (are) directly engageable by the central region 56 of the strike 50 (shown in FIGS. 9–11). If the first and second U-shaped notches 501, 502 are identically configured and positioned to extend in congruent alignment, a pair of congruently aligned strike engagement surfaces 492, 493 are defined by the notches 501, 502—which are engageable by the central region 56 of the strike 50 as the central region 56 moves into and is latchingly retained within the U-shaped notches 501, 502. If, on the other hand, the first U-shaped notch 501 is configured such that it is wider than the second U-shaped notch 502 (so that the surfaces that define the first notch 501 are positioned such that they cannot physically engage the strike 50), the only strike engagement surface that will be defined by either of the notches 501, 502 is the strike engagement surface 493 that is defined by the second U-shaped notch 502.

By always ensuring that the strike engagement surface 493 is defined by the second U-shaped notch 502 (regardless of whether an additional strike engagement surface 492 is defined by the first U-shaped notch 501), advantage will always be taken of the close proximity presence to the second notch 502 (and to the strike engagement surface 493) of a transversely extending reinforcing flange 471 (see FIG. 2) that is formed integrally with the second side plate 404 near one end thereof. A tight radius bend 473 (see FIG. 1) connects the flange 471 to a narrow portion 475 (see FIGS. 1 and 2) of the second side plate 404 that extends along one side of the second notch 502 (and that defines the strike engagement surface 493). The close proximity presence of the transversely extending flange 471 and the bend 473 to the second notch 502 (and to the strike engaging surface 493 that is defined by the second notch 502) strengthens and rigidifies the second housing side plate 404 in the critical area adjacent the strike engaging surface 493.

While the second U-shaped notch 502 could be configured such that it is wider than the first U-shaped notch 501 (whereby the only strike engagement surface that would be defined by either of the notches 501, 502 is the strike engagement surface 492 that is defined by the first U-shaped notch 501), this option does not conform to the preferred practice of the present invention unless the first side plate 402 is. provided with a transversely extending flange (not shown) that is substantially identical to the depicted flange 471, but which extends from the first side plate 402 toward the second side plate 404 to bridge the space therebetween (instead of extending from the second side plate 404 toward the first side plate 402 to bridge the space therebetween, as does the depicted flange 471).

Referring to FIG. 1, housed between the side plates 402, 404 are the rotary jaw 410 and the rotary pawl 420. The rotary jaw 410 has a mounting hole 411 that receives the bushing diameter 438 therein in a slip fit to mount the rotary jaw 410 on the bushing 408 for limited angular movement about the transversely extending axis 458. The rotary pawl 420 has a mounting hole 421 that receives the bushing diameter 448 therein in a slip fit to mount the rotary pawl 420 on tile bushing 406 for limited angular movement about the transversely extending axis 456.

Also housed between the side plates 402, 404 is a torsion coil spring. 480 that has a first coil 486 that extends about the diameter 436 of the bushing 406, and a second coil 488 that extends about the diameter 438 of the bushing 408. An end 481 of the spring 480 engages the rotary jaw 410 for biasing the rotary jaw 410 in a direction of angular movement about the axis 458 that is indicated by an arrow 485. An opposite end 483 of the spring 480 engages the rotary pawl 420 for biasing the rotary pawl 420 in a direction of angular movement about the axis 456 that is indicated by an arrow 487.

Referring to FIGS. 7–9, the rotary jaw 410 and the rotary pawl 420 are provided with engageable formations 413, 423, respectively, that cooperate to "preliminarily latch" the rotary jaw 410 in engagement with the central region 56 of the strike 50 after the strike 50 has moved only a short distance into the aligned first and second U-shaped notches 501, 502 during movement of the closure toward its closed position.

The rotary jaw 410 and the rotary pawl 420 also are provided with engageable formations 415, 423, respectively, that cooperate to "fully latch" the rotary jaw 410 in engagement with the central region 56 of the strike 50 after the strike 50 has moved as far as it is going to move into the aligned first and second U-shaped notches 501, 502 as the closure is moved to its fully closed position. When the engageable formations 415, 423 are engaged (as is depicted in FIG. 10), the rotary jaw 410 is prevented by the rotary pawl 420 from executing unlatching movement until the rotary pawl 420 is rotated about the axis 456 to a pawl-releasing position (this is effected when the second operating arm 300 is pivoted to bring the end region 278 into engagement with an operating formation or "trigger" 429 of the pawl, shown in FIG. 1, to cause the pawl 420 to pivot in opposition to tile action of the spring coil 488) wherein the engageable formations 415, 423 disengage to permit the rotary jaw 410 to rotate away from its fully latched position toward its unlatched position wherein the strike 50 is free to move out of the third U-shaped notch 503 that is defined by the rotary jaw 410. This type of pawl-controlled jaw latching action is well known to those who are skilled in the art.

To move the rotary pawl 420 in opposition to the action of the torsion coil spring 480 (i.e., in a direction opposite the arrow 487) from a pawl-retaining position (depicted in FIGS. 10 and 11) to a pawl-releasing position (depicted in FIG. 7), the second operating arm 300 is pivoted (about the axis of the fastener 290 from the non-operated position depicted in FIG. 3 to the operated position depicted in FIG. 4—which can only be done if the lock mechanism 200 has been operated to position the cam 210 in its unlocked position, as shown in FIG. 4) by operating the handle 150 (to pivot the handle 150 about the axis of the pin 156 from its normal non-operated position shown in FIGS. 1 and 5 to its operated position shown in FIG. 6). When the operated handle 150 is released, it returns to its non-operated position under the influence of the spring 282 (because the action of the spring 282 on the second operating arm 300 is transferred to the first operating arm 250 by the engagement of the driving formations 234, 272, which, in turn, causes the stub shaft 152 to pivot the T-shaped handle grip 170 from its operated position to its non-operated position).

So long as the rotary jaw 410 of tile latch assembly 400 is in its unlatched position (depicted in FIG. 7), the rotary jaw 410 always can be slammed into latching engagement with the strike 50. This is true regardless of how other relatively movable components of the unit 100 may be positioned. As the rotary jaw 410 receives the strike 50 within its third U-shaped notch 503, and as the strike 50 moves into the aligned first and second IU-shaped notches 501, 502 of the housing side plates 402, 404, the strike 50 becomes cooperatively confined by the combined action of the first, second and third notches 501, 502, 503. When the strike 50 reaches the position that is depicted in FIG. 10, the rotary pawl 420 and the rotary jaw 410 become "preliminarily latched" (i.e., the engagement formations 413, 423 engage to prevent unlocking of the rotary jaw 410). When the strike 50 reaches the fully latched position depicted in FIG. 11, the engagement formations 415, 423 engage to fully lock the closure in its closed position.

So long as the key-locking assembly 200 positions the cam 210 in its "unlocked" position, as is depicted in FIGS. 4 and 6, pivotal movement of the second operating arm 300 will not be impeded by the cam 210—hence, the operating handle 150 can be pivoted out of its nested, non-operated position (shown in FIG. 5) to its extended, operated position (shown in FIG. 6) to cause the projecting formation 175 to pivot the second operating arm 300 to engage the trigger 429 of the pawl 420 to pivot the rotary pawl 420 away from its normal jaw-retaining position (shown in FIG. 11) toward its jaw-releasing position (shown in FIG. 9) to release the pawl formation 423 from engaging either of the jaw formations 413, 415, whereupon the rotary jaw 420 pivots under the influence of the spring 480 away from its latched position (shown in FIG. 11) to its unlatched position (shown. in FIG. 9) to release the strike 50.

In operation, the T-handle grip 170 of the unit 100 can be pivoted between its nested position (shown in FIGS. 5 and 7) and its extended position (shown in FIGURES 6 and 8) regardless of whether the key lock assembly 200 is in its locked orientation (shown in FIGS. 2 and 3) or in its unlocked orientation (shown in FIG. 3). If the T-handle 150 is to be rotated about the axis 155 of the stub shaft 152 to operate the unit 100 to unlatch the latch assembly 400, the T-handle grip 170 must be pivoted to its extended position (shown in FIG. 6) and the key lock assembly 200 must be operated to position the cam 210 in its unlocked orientation (shown in FIG. 3) so as to disengage the end region 276 of the second operating arm 300 so that the handle 150 can be rotated (as shown in FIGS. 6 and 8) to pivot the first and second operating arms 250, 300 from their non-operated positions (shown in FIGS. 2 and 3) to their operated positions (shown in FIG. 4) to cause the projecting end 278 of the second operating arm 300 to pivot the pawl 420 of the latch assembly 400 to release the rotary latch bolt 410 so that it will pivot under the influence of the spring 480 from the latched position (shown in FIG. 11) to the unlatched position (shown in FIG. 9). When the handle 150 is released (or when force applied to the handle 150 to rotate the handle 150 about the axis 155 is diminished sufficiently to permit the handle 150 and the operating arms 250, 300 to return to their non-operated positions under the influence of the spring 282), the spring 282 returns the handle 150 and the first and second operating arms 250, 300 to their non-operated positions.

If the latch assembly 400 is to be slammed into latched engagement with the strike 50 when the rotary latch bolt 410 is in the unlatched position shown in FIG. 9, preliminary latching, as depicted in FIG. 10, occurs before full latching, as depicted in FIG. 11, takes place.

Figure 12:
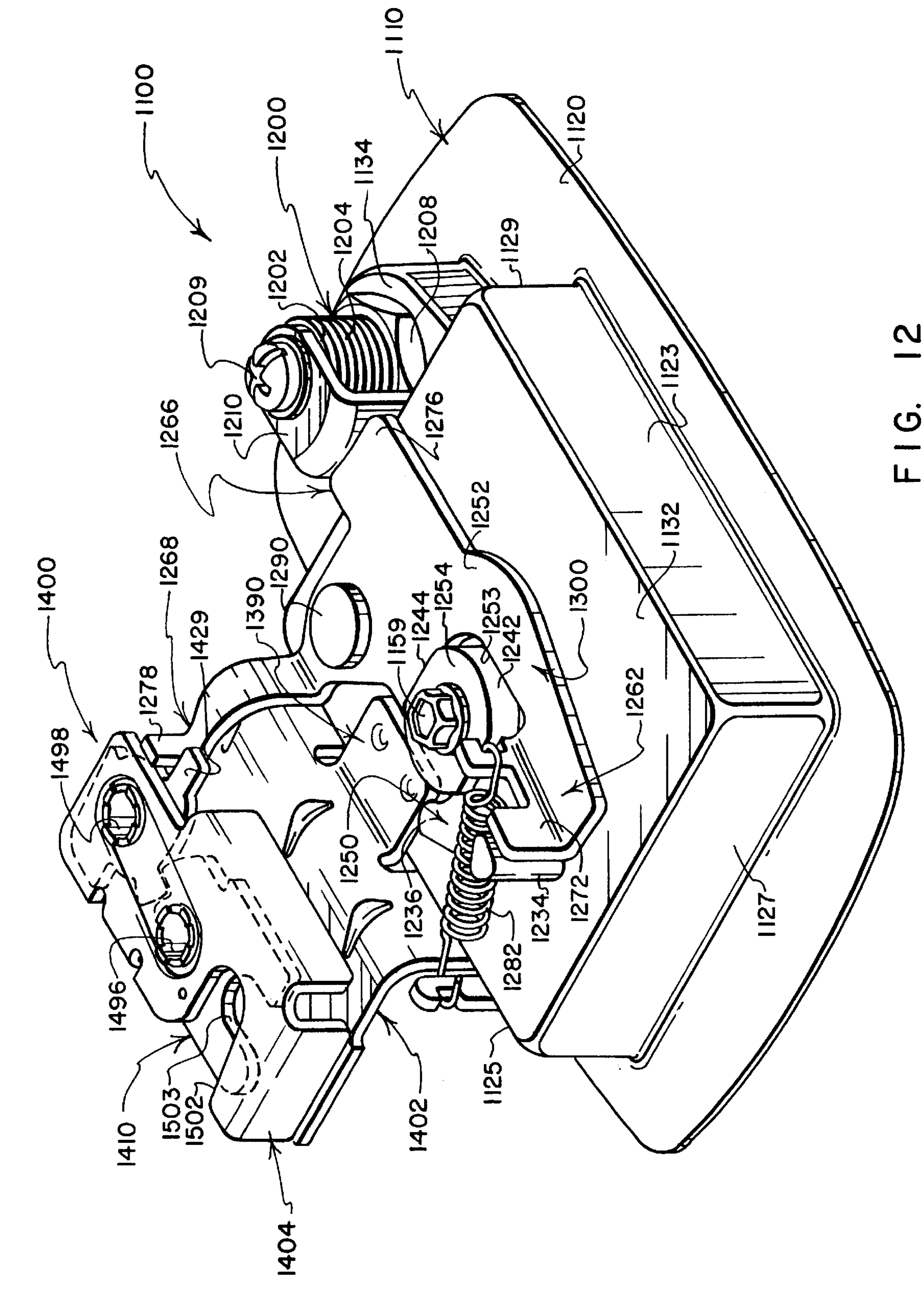
FIG. 12 is a rear perspective view of a second embodiment of a latch and lock unit that incorporates features of the invention, with its rotary jaw in a latched position, with its first and second operating arms in their non-operated positions, and with its locking cam in a locked position—which necessitates that the T-shaped operating handle of the unit be in its, non-operated position.
Figure 13:
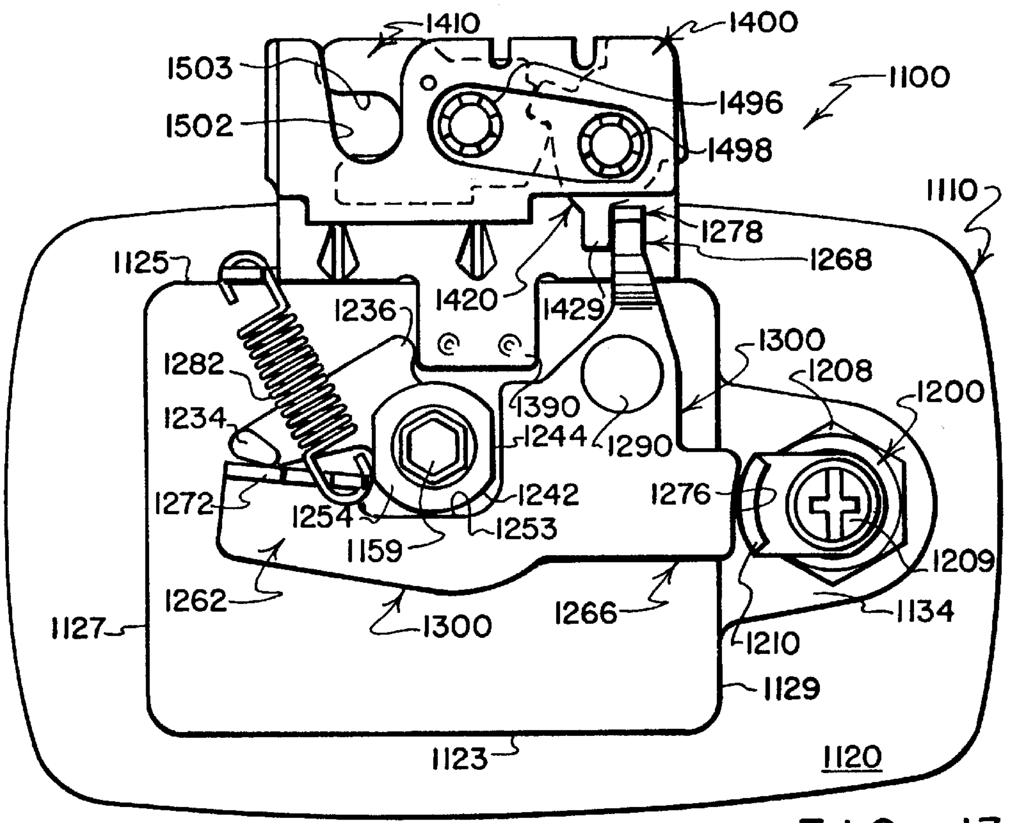
FIG. 13 is a rear elevational view thereof.
Figure 14:
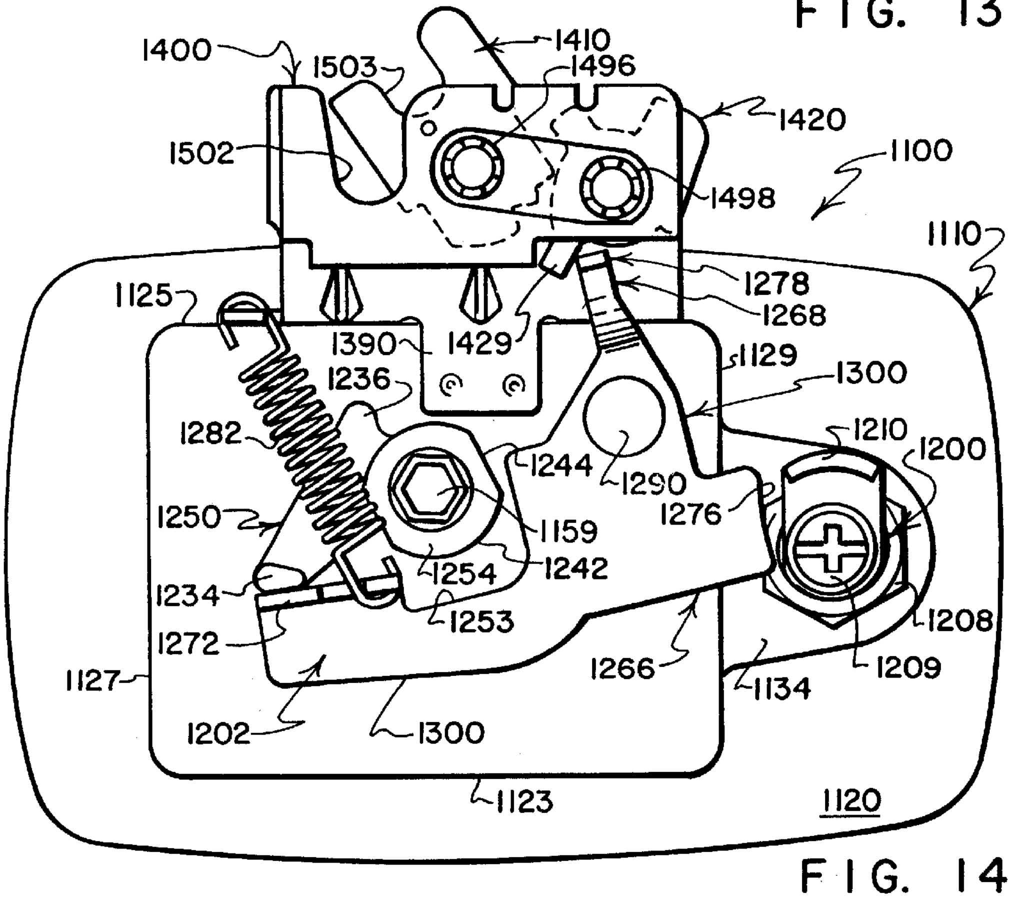
FIG. 14 is a rear elevational view similar to FIG. 13 but with the locking cam in an unlocked position, and with other components moved in response to movement of the T-shaped operating handle to its operated position, namely with the first and second operating arms shown in their operated positions causing the the rotary pawl to move to "unlatch" the rotary jaw, and with the rotary jaw in an unlatched position.

Referring to FIGS. 12–13, a second latch embodiment incorporating features of the invention is indicated by the numeral 1100. The second latch embodiment 1100 is substantially identical to the first latch embodiment 100 except that the latch assembly 1400 has a right angle bend in its side plate 1401 to differently orient the latch assembly 1400 with respect to the housing 1100; and except that the second operating arm 1300 has an extended end region 1268 with an operating formation 1278 that extends out over the bend in the side plate 1401 to engage the pawl 1420 of the repositioned latch assembly 1400.

Inasmuch as the latch embodiments 100, 1100 have corresponding components that operate substantially identically, corresponding reference numerals that differ by a magnitude of one thousand have been used to identify corresponding components of the latch embodiments 1001 1100. Thus, whereas the unit 100 consists of a housing 110, an operating handle 150, first and second operating arms 250, 300 and a latch assembly 400, the unit 1100 consists of a corresponding housing 1110, a corresponding operating handle 1150, corresponding first and second operating arms 1250, 1300, and a corresponding latch assembly 1400, respectively. The use of these and other corresponding numerals that differ by a magnitude of one thousand eliminates the need to repeat the detailed description of features of the unit 100 (that appears earlier herein) to describe the unit 1100, as those who are skilled in the art will readily understand.

Figure 15:
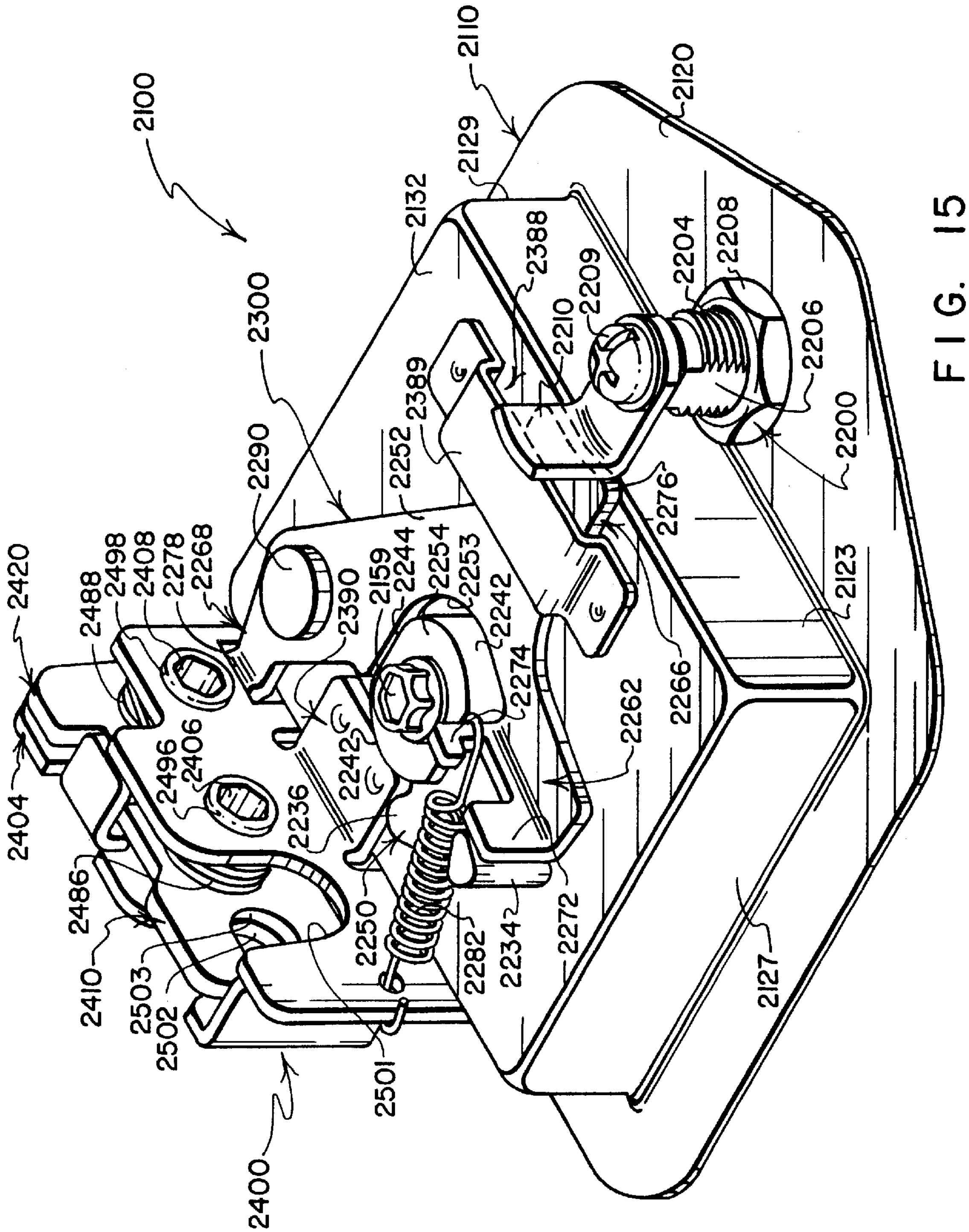
FIG. 15 is a rear perspective view of a third embodiment of a latch and lock unit that incorporates features of the invention, with its rotary jaw in a latched position, with its first and second operating arms in their non-operated positions, and with its locking cam in a locked position—which necessitates that the T-shaped operating handle of the unit be in its non-operated position.
Figure 16:
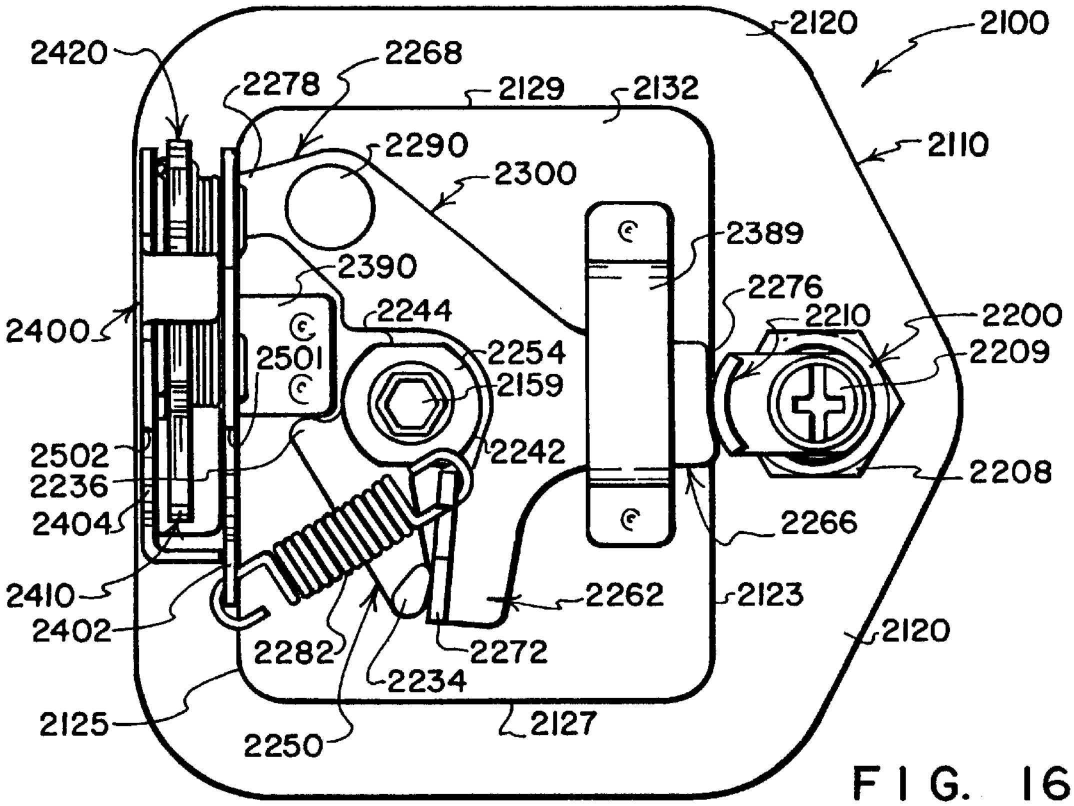
FIG. 16 is a rear elevational view thereof.
Figure 17:
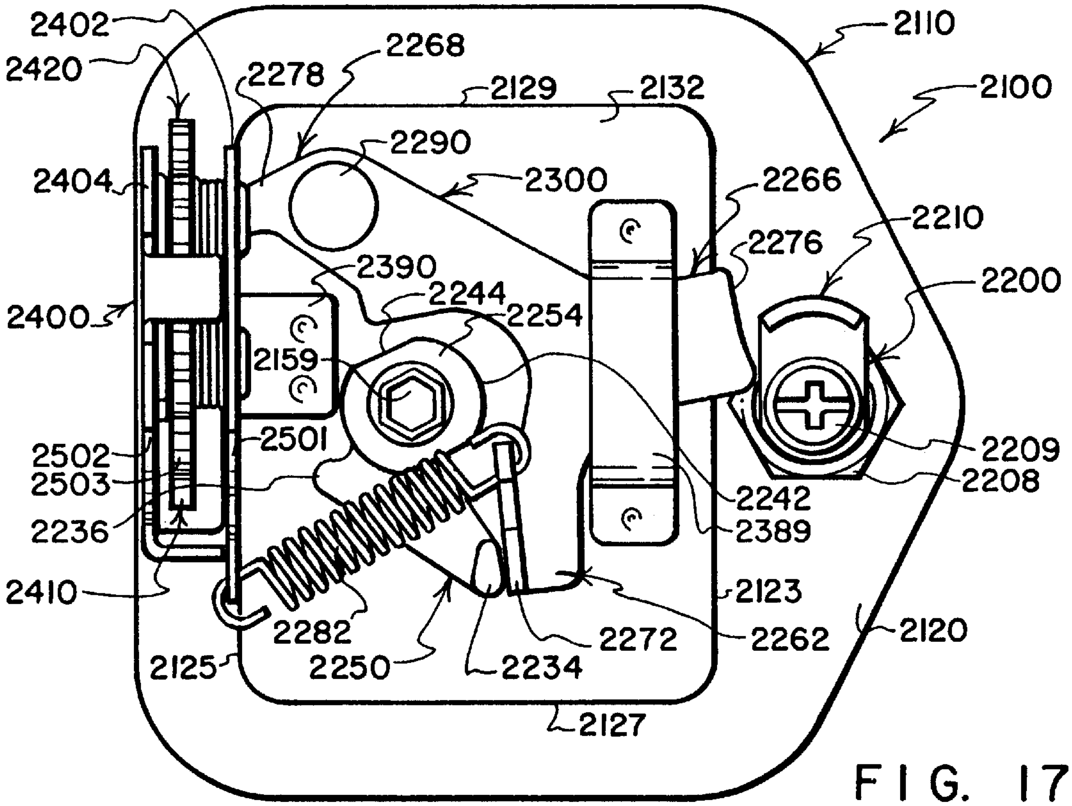
FIG. 17 is a rear elevational view similar to FIG. 16 but with the locking cam in an unlocked position, and with other components moved in response to movement of the T-shaped operating handle to its operated position, namely with the first and second operating arms shown in their operated positions causing the the rotary pawl to move to "unlatch" the rotary jaw, and with the rotary jaw in an unlatched position.

Referring to FIGS. 15–16, a third latch embodiment incorporating features of the invention is indicated by the numeral 2100. The third latch embodiment 2100 is substantially identical to the first latch embodiment 100 except that the housing 2110 of the third latch embodiment 2100 has a five-sided mounting flange 2120 that permits the key lock assembly 2200 to be repositioned to a location along the side wall 2123 of the housing 2100; except that the cam 2210 of the key lock assembly 2200 is differently configured to engage an end region 2266 of the second operating arm 2300 (which also is reconfigured to position the end region 2266 adjacent the cam 2210) with the key lock assembly 2200 being installed in the mounting flange 2110 rather than in a shallow portion of the recess defined by the housing 2110; and, except that the end region 2266 extends through a guide passage 2388 that is defined by the housing back wall portion 2132 and by a strap 2389 that overlies and has its end regions 2314 welded to the back wall portion 2132. The strap 2389 serves to guide the movements of the second operating arm 2300, and aids in supporting the second operating arm 2300 to resist deformation of the second operating arm 2300 during applications of undue force to the latch and lock unit 2100.

Inasmuch as the latch embodiments 100, 2100 have corresponding components that operate substantially identically, corresponding reference numerals that differ by a magnitude of two thousand have been used to identify corresponding components of the latch embodiments 100, 2100. Thus, whereas the unit 100 consists of a housing 110, an operating handle 150, first and second operating arms 250, 300 and a latch assembly 400, the unit 2100 consists of a corresponding housing 2110, a corresponding operating handle 2150, corresponding first and second operating arms 2250, 2300, and a corresponding latch assembly 2400, respectively. The use of these and other corresponding numerals that differ by a magnitude of one or two thousand eliminates the need to repeat the detailed description of the unit 100 (that appears earlier herein) to describe the unit 2100, as those who are skilled in the art will readily understand.

Figure 18:
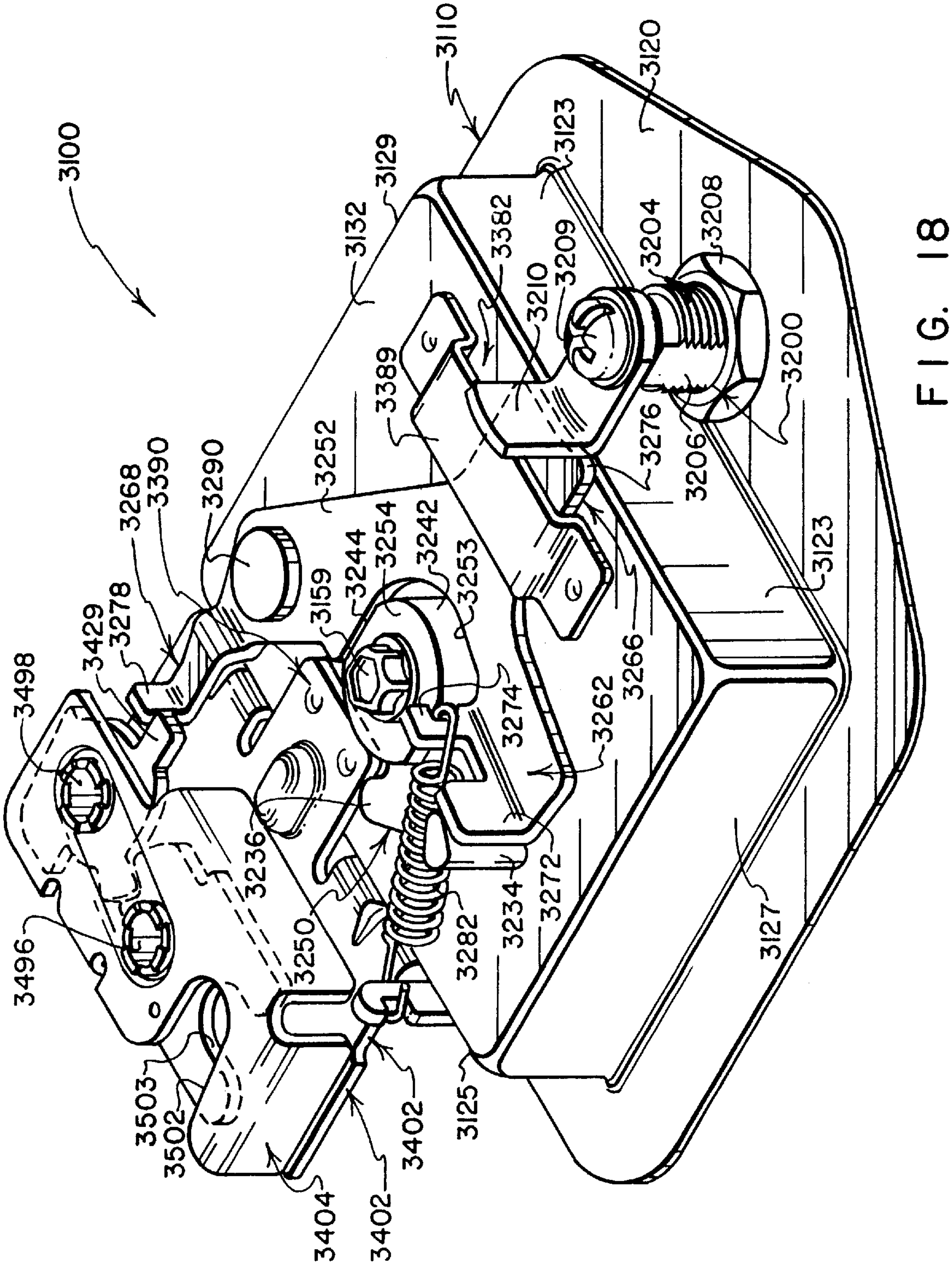
FIG. 18 is a rear perspective view of a fourth embodiment of a latch and lock unit that incorporates features of the invention, with its rotary jaw in a latched position, with its first and second operating arms in their non-operated positions, and with its locking cam in a locked position—which necessitates that the T-shaped operating handle of the unit be in its non-operated position.
Figure 19:
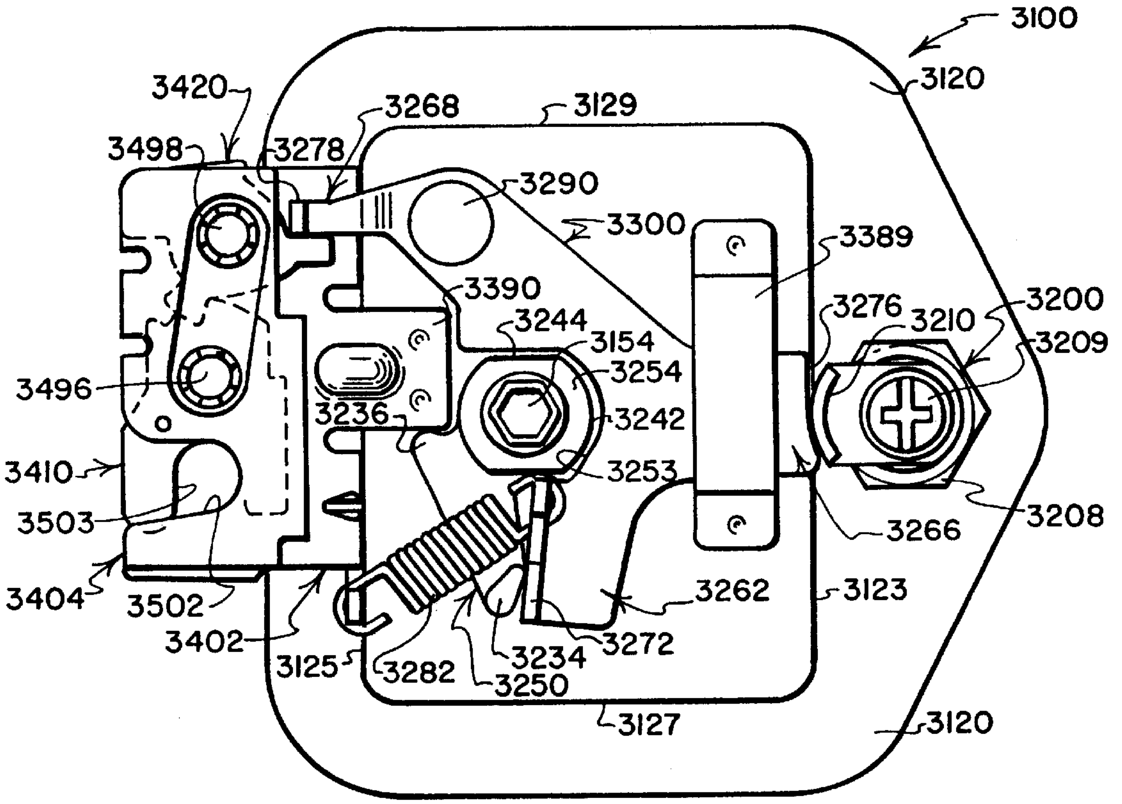
FIG. 19 is a rear elevational view thereof.
Figure 20:
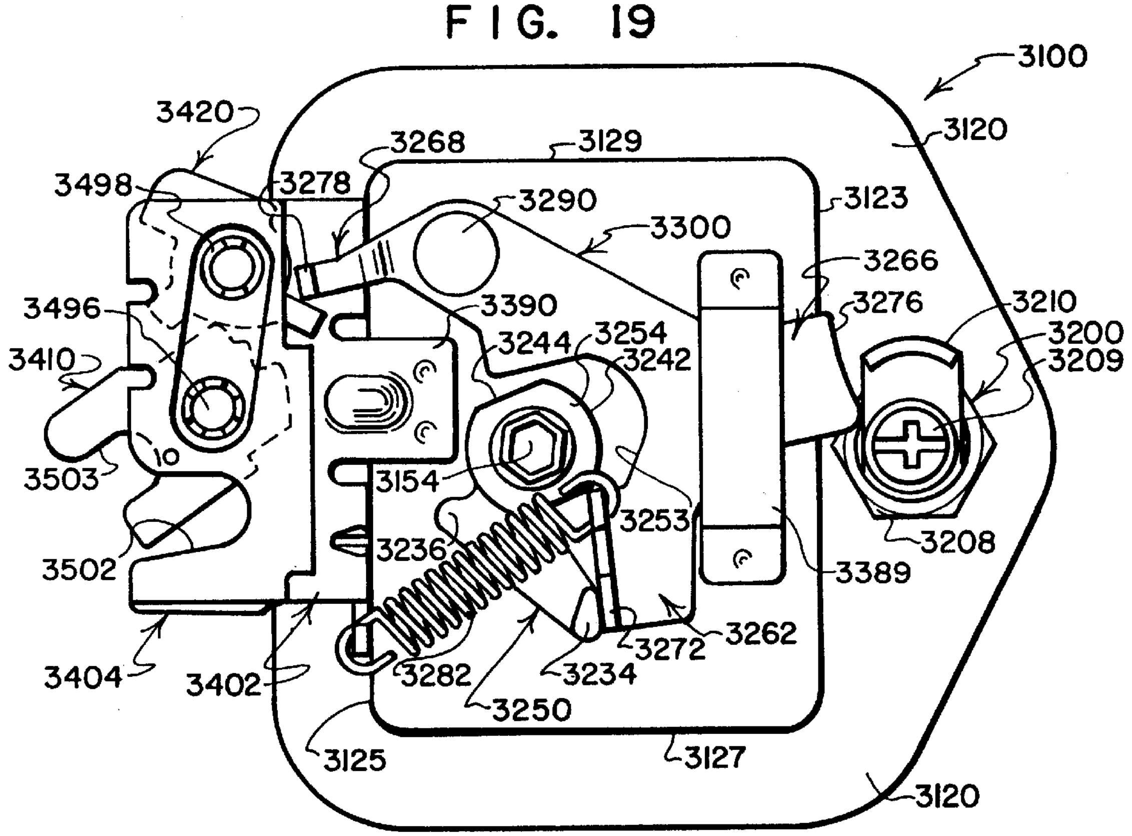
FIG. 20 is a rear elevational view similar to FIG. 19 but with the locking cam in an unlocked position, and with other components moved in response to movement of the T-shaped operating handle to its operated position, namely with the first and second operating arms shown in their operated positions causing the the rotary pawl to move to "unlatch" the rotary jaw, and with the rotary jaw in an unlatched position.

Referring to FIGS. 18–20, a fourth latch embodiment incorporating features of the invention is indicated by the numeral 3100. The fourth latch embodiment 3100 is substantially identical to the third latch embodiment 2100 except that the latch assembly 3400 has a right angle bend in its side plate 3.401 to differently orient the latch assembly 3400 with respect to the housing 3100; and except that the second operating arm 3300 has an extended end region 3268 with an operating formation 3278 that extends out over the bend in the side plate 3401 to engage the pawl 3420 of the repositioned latch assembly 3400.

Inasmuch as the latch embodiments 2100, 3100 have corresponding components that operate substantially identically, corresponding reference numerals that differ by a magnitude of one thousand have been used to identify corresponding components of the latch embodiments 2100, =3100. Thus, whereas the unit 2100 consists of a housing 2110, an operating handle 2150, first and second operating arms 2250, 2300 and a latch assembly 2400, the unit 3100 consists of a corresponding housing 3110, a corresponding operating handle 3150, corresponding first and second operating arms 3250, 3300, and a corresponding latch assembly. 3400, respectively. The use of these and other corresponding numerals that differ by a magnitude of one, two or three thousand eliminates the need to repeat the detailed description (that appears earlier herein) to describe the unit 3100, as those who are skilled in the art will readily understand.

Such differences as exist among the components of the latch and lock embodiments 100, 1100, 2100, 3100 do not give. rise to fundamental differences in the way in which the embodiments 100, 1100, 2100, 3100 function—as will be readily apparent to those who are skilled in the art.

Each of the units 100, 1100, 2100, 3100 have in common the use of first (relatively short) and second (relatively long) independently pivoted operating arms (250, 300; 1250, 1300; 2250, 2300; and 3250, 3300, respectively) that rotate through a relatively large range of angular movement (such as about thirty degrees) and a relatively small range of angular movement (such as about fifteen degrees), respectively, that have driving formations (234, 272; 1234, 1272; 2234, 2272; and 3334, 3372, respectively) that engage when the their T-shaped operating handles (which are all identical to the described operating handle 150) are pivoted to cause operating arm movement (in the manner described in conjunction with the operating arms 250, 300) to trigger, release or unlatch their associated rotary latch assemblies 400, 1400, 2400, 3400, respectively.

Each of the units 100, 1100, 2100, 3100 also have in common the use of stop formations 236, 1236, 2236, 3236 carried by their first operating arms 250, 1250, 2250, 3250 that engage tab-like extensions 390, 1390, 2390, 3390 of the latch assemblies 400, 1400, 2400, 3400 (wherein the tab-like extensions overlie and are rigidly connected to back wall portions 132, 1132, 2232, 3232 of the housings 110, 1110, 2110, 3110) to limit the reverse pivotal movement of the first operating arms 250, 1250, 2250, 3.250, respectively.

Each of the units 100, 1100, 2100, 3100 also have in common the use of engagements between the first and second operating arms (250, 300; 1250, 1300; 2250, 2300; and 3250, 3300, respectively) that cause the first and second operating arms to pivot concurrently in forward and return directions of angular movement about their separate pivot axes, and that limit the reverse pivotal movement of the second operating arms 300, 1300, 2300, 3300. For the purpose of limiting the return direction pivotal movement of the second operating arms 300, 1300, 2300, 3300, so-called "second stop surfaces" are defined by each of the first operating arms 250, :1250, 2250, 3250 that may take either or both of the forms of: 1) the drive formations 234, 1234, 2234, 3234 of the first operating arms 250, 1250, 2250, 3250 that are engaged by the drive formations 272, 1272, 2272, 3272 of the second operating arms 300, 1300, 2300, 3300; or 2) outer surface portions (242 and/or 244; 1242 and/or 1244; 2242 and/or 2244; 3242 and/or 3244 that are defined by the hubs 254, 1254, 2254, 3254 of the first operating arms 250, 1250, 2250, 3250, respectively) that are engaged by adjacent surfaces 253, 1253, 2253, 3253 of the second operating arms 300, 1300, 2300, 3300, respectively.

Referring, for example, to FIG. 3, it will be seen that the second operating arm has its drive formation 272 in stopped engagement with the drive formation 234 of the first operating arm 250 when the first operating arm 250 is stopped from further reverse movement by the engagement of its stop formation 236 with the tab-like extension 390 of the latch assembly 400; and that, at the same time, a surface 253 of the second operating arm 400 engages a rounded surface 242 defined by the hub 254—with both of these engagements serving to stop further reverse pivoting of the second operating arm 300. While one or both of these stopping types of engagement can be utilized, and while the use of either of these manners of stopping reverse direction pivotal movement of the second operating arm falls within the purview of the present invention, the concurrent use of both manners of stopping the reverse pivotal movement of the second operating arm may be desirable in some applications.

Referring, by way of another example, to FIG. 15, it will be seen that, while the second operating arm 2250 has a surface 2353 that could be configured to engage either or both of the surfaces 2242, 2244 of the hub 2254 (so that either or both of these engagements could be utilized to stop the return movement of the second operating arm when the first operating arm has its stop formation 2236 in engagement with the tab-like extension 2390 of the latch assembly 2400), the reverse pivotal movement of the second operating arm 2250 is, instead, stopped by the engagement of the operating formations 2234, 2272. Sole or combined use of any of these types of stopping engagements between the first and second operating arms 2250, 2300 also is within the contemplated purview and scope of the present invention.

If it is desired, for some reason, to stop reverse direction pivotal movement of any of the described second operating arms before the reverse direction pivotal movement of the associated first operating arms are stopped (for example by engagement of the stop formation 236 with the tab-like formation 390), this can be accomplished by configuring the hub of the first operating arm (for example the hub 254) so that one or both of its outer surfaces (such as the surfaces 242, 244) is/are engaged by a surface of the second operating arm (such as the surface 253) before the stop formation of the first operating arm (such as the formation 236) engages the associated tab-like formation (such as the formation 390). This arrangement effectively provides for individualized stopping of the reverse direction pivotal movement of the first and second operating arms, and also is within the contemplated purview and scope of the present invention.

Thus, as will be seen from the foregoing description, taking into account the claims that follow, features of the present invention reside in the provision of a T-handle operating assembly for a rotary latch that includes the use of a pair of independently pivoted operating arms that drivingly interconnect the handle and the latch assembly, with the operating arms and reverse pivot stops being provided in a compact arrangement that, as a minimum, makes use of a tab-like extension of the side wall of a rotary latch housing as a stop for the first operating arm, and with a formation of the first operating arm also serving as a reverse pivot stop for the second operating arm.

As a comparison of the operating arms, as shown in FIGS. 3, 13, 16 and 19 will disclose, the units 100, 1100, 2100, 3100 also share the use of second operating arms 300, 1300, 2300, 3300 that are C-shaped in the sense that they wrap about half way around the hubs 254, 1254, 2254, 3354 of the first operating arms 250, 1250, 2250, 3350 to provide locations where the operating formations engage (i.e., where the formation 234 engages the formation, 272; where the formation 1234 engages the formation 1272; where the formation 2234 engages the formation 2272; and where the formation 3234 engages the formation 3272) that are located on opposite sides of the pivot axes of the first operating arms from the pivot axes of the second operating arms. By this arrangement, the second operating arms 300, 1300, 2300, 3300 have effective lengths (defined as the distances from their pivot axes to the locations where the operating formations engage) that are about twice as long as the effective lengths of the first operating arms 250, 1250, 2250, 3250 (defined as the distances from their pivot axes to the locations where the operating formations engage); and, the longer second operating arms pivot through smaller ranges of angular movement (typically about fifteen degrees) than do the shorter first operating arms (which pivot through ranges of about thirty degrees). What this arrangement provides is a means for reducing the relatively large angles of movement of the T-handles of the units 100, 1100, 2100, 3100 to provide what is needed in the way of smaller angular movements to better suit the range of angular movement that is better suit the limited amount of movement that needs to be effected by the extensions 278, 1278, 2278, 3278 of the second operating arms that cause the rotary latch pawls 420, 1420, 2420, 3420 to pivot to release of the rotary latch bolts 410, 1410, 2410, 3410 of the rotary latch assemblies 400, 1400, 2400, 3400.

Stated in another way, the compact arrangement of operating arms that are of different length and that pivot through different ranges of movement is used advantageously herein to provide T-handle operated latches that permit their T-shaped operating handles to be pivoted through ranges of movement that are acceptable to those who utilize these units, while causing the second operating arms to diminish their ranges of movement so as to better accommodate the needs of the rotary latch assemblies that are employed, which require relatively little pawl movement to effect release of their rotary latch bolts.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A flush-mountable, T-handle operated, rotary latch, comprising:

a) a pan-shaped housing defining a forwardly facing recess with a rear portion of the recess being closed by a back wall having a substantially flat main back wall portion extending in an imaginary first plane, and having a back wall opening formed centrally there-through;

b) a rotary latch assembly including a latch assembly housing that is connected to the pan-shaped housing by at least a substantially flat tab-like formation of the latch assembly housing that extends in a second imaginary plane located lust behind the main back wall portion and extending substantially parallel to the first imaginary plane, with the tab-like formation being directly rigidly connected to the main back wall portion of the pan-shaped housing, wherein the rotary latch assembly additionally includes a rotary jaw that is rotatable between latched and unlatched positions, first biasing means for biasing the rotary jaw toward the unlatched position, and a rotary pawl that is movable between a retaining position wherein the rotary pawl engages the rotary jaw to retain the rotary jaw in the latched position in opposition to the action of the first biasing means, and a release position wherein the rotary pawl releases the rotary jaw to permit the rotary jaw to pivot to the unlatched position under the influence of the first biasing means;

c) a T-handle that is foldable to nest within the forwardly facing recess of the housing, that is extendable to project from the recess, and that is connected to the pan-shaped housing for pivotal movement such that, when the T-handle is extended to project from the recess, the T-handle can be pivoted between non-operated and operated positions of the T-handle, with this pivotal movement being about a first pivot axis that is defined by a shaft portion of the T-handle that projects through the back wall opening;

d) a first operating arm connected to the shaft portion of the T-handle for pivotal movement there-with about the first pivot axis between non-operated and operated positions of the first operating arm, wherein the first operating arm extends in the second plane so as to closely overlie and extend alongside the main back wall portion of the pan-shaped housing away from the first pivot axis to define a first operating formation;

e) a second operating arm connected to the main back wall portion for pivotal movement about a second pivot axis that is spaced from and extends substantially parallel to the first pivot axis, wherein the second operating arm extends in the second plane so as to closely overly and extend alongside the back wall away from the second pivot axis to define a second operating formation that is engageable with the first operating formation to cause the second operating arm to move from a non-operated position of the second operating arm to an operated position of the second operating arm in response to movement of the first operating arm from the non-operated position of the first operating arm to the operated position of the first operating arm, and wherein the second operating arm includes formation means for operating the rotary latch to cause the rotary pawl to release the rotary jaw for rotation to the unlatched position in response to pivotal movement of the second operating arm to the operated position of the second operating arm;

f) second biasing means for biasing at least a selected one of the first and second operating arms in a return direction of pivotal movement away from the operated position of the selected one of the operating arms toward the non-operated position of the selected one of the operating arms; and, g) with the tab-like formation of the rotary latch assembly and the first operating arm being configured to engage in the second plane when the first operating arm pivots in the return direction of pivotal movement to the non-operated position of the first operating arm so as to stop return direction pivotal movement of the first operating arm at the non-operated position of the first operating arm, and to thereby concurrently stop the T-handle at the non-operated position of the T-handle.

2. The rotary latch of claim 1 wherein the selected one of the first and second operating arms is the second operating arm, and the first and second operating arms are configured such that the biasing action of the second biasing means is transmitted by the second operating arm to the first operating arm by means of engagement of operating formations defined by each of the first and second operating arms, whereby the second biasing means serves to bias the first operating arm toward the non-operated position of the first operating arm at the same time that the second biasing means serves to bias the second operating arm toward the non-operated position of the second operating arm.

3. The rotary latch of claim 2 wherein:

a) the first operating arm is relatively short and pivots through a relatively large range of angular movement when moving between the non-operated and operated positions of the first operating arm; and, b) the second operating arm is relatively long and pivots through a relatively smaller range of angular movement when moving between the non-operated and operated positions of the second operating arm.

4. The rotary latch of claim 1 additionally including a key-operated lock assembly connected to the pan-shaped housing and having a cam that is movable between a locked position wherein the cam blocks pivotal movement of the operating arms toward the operated positions thereof, and an unlocked position wherein the cam does not block pivotal movement of the operating arms.

5. The rotary latch of claim 1, wherein:

a) the first operating arm has a hub formation at a location where the first operating arm connects with the shaft portion, and a first reach of material that extends in the second plane closely alongside the main back wall portion between the hub formation and the first operating formation; and, b) the second operating arm has a second reach of material that extends in the second plane closely alongside the main back wall portion between the second pivot axis and the second operating formation, wherein the second reach is substantially longer than the first reach.

6. The rotary latch of claim 5 the second reach includes a generally C-shaped region of material that wraps about the hub formation of the first operating arm to position the second operating formation to engage the first operating formation at a location on the opposite side of the first pivot axis from the second pivot axis.

7. The rotary latch of claim 6 wherein the C-shaped region of material is configured to engage the hub formation when the second operating arm is in the non-operated position of the second operating arm.

8. A flush-mountable, T-handle operated, rotary latch, comprising:

a) a pan-shaped housing defining a forwardly facing recess with a rear portion of the recess being closed by a back wall having a substantially flat main back wall portion extending in an imaginary first plane, and having a back wall opening formed centrally therethrough;

b) a rotary latch assembly including a latch assembly housing and means for connecting the latch assembly housing to the pan-shaped housing;

c) a T-handle that is foldable to nest within the forwardly facing recess of the housing, that is extendable to project from the recess, and that is connected to the pan-shaped housing for pivotal movement such that, when the T-handle is extended to project from the recess, the T-handle can be pivoted between non-operated and operated positions of the T-handle, with this pivotal movement being about a first pivot axis that is defined by a shaft portion of the T-handle that projects through the back wall opening;

d) a first operating arm connected to the shaft portion of the T-handle near for pivotal movement in a second imaginary plane located just behind the main back wall portion and extending substantially parallel to the first imaginary plane about the first pivot axis between non-operated and operated positions of the first operating arm, wherein the first operating arm extends along the main back wall portion of the pan-shaped housing away from the first pivot axis to define a first operating formation;

e) a second operating arm having a substantially flat portion thereof extending in the second plane and connected to the main back wall portion for pivotal movement about a second pivot axis that is spaced from and extends substantially parallel to the first pivot axis, wherein the substantially flat portion of the second operating arm extends closely alongside the main back wall portion away from the second pivot axis to By define a second operating formation that is engageable with the first operating formation to cause the second operating arm to move to from a non-operated position of the second operating arm to an operated position of the second operating arm in response to movement of the first operating arm from the non-operated position of the first operating arm to the operated position of the first operating arm, and wherein the second operating arm includes formation means for operating the rotary latch when the second operating arm is in the operated position of the second operating arm; and, f) biasing means for biasing at least a selected one of the first and second operating arms in a return direction of pivotal movement away from the operated position of the selected one of the operating arms toward the non-operated position of the selected one of the operating arms.

9. The rotary latch assembly of claim 8, wherein:

a) the means for connecting the latch assembly housing to the pan-shaped housing includes a substantially flat tab-like formation of the latch assembly housing that extends in the second plane and is directly rigidly connected to the main back wall portion of the pan-shaped housing; and, b) the tab-like formation of the rotary latch assembly and the first operating arm are configured to engage when the first operating arm pivots in the return direction of pivotal movement to the non-operated position of the first operating arm so as to stop return direction pivotal movement of the first operating arm at the non-operated position of the first operating arm, and to thereby concurrently stop the T-handle at the non-operated position of the T-handle.

10. The rotary latch of claim 8 wherein the first operating arm has an effective length defined as the distance from the first pivot axis to the location where the operating formations of the first and second operating arms engage that is shorter than the effective length of the second operating arm defined as the distance from the second pivot axis to said location, and wherein the first operating arm pivots through a greater range of angular movement in pivoting between the non-operated and operated positions of the first operating arm than is executed by the second operating arm when pivoting between the non-operated and operated positions of the second operating arm.

11. The rotary latch of claim 10 wherein said location is on an opposite side of the first pivot axis from a location of the second pivot axis.

12. The rotary latch of claim 11 wherein the first operating arm has a hub formation at a location where the first operating arm joins the stub shaft portion of the T-handle, and the second operating arm has a C-shaped portion that wraps about one side of the hub formation in extending from said location of the second pivot axis to said location where the operating formations of the first and second operating arms engage.

13. The rotary latch of claim 8 additionally including a key-operated lock assembly connected to the pan-shaped housing and having a cam that is movable between a locked position wherein the cam extends into a path of movement followed by the second operating arm in moving from the non-operated position of the second operating arm to operated position of the second operating arm for blocking movement of the second operating arm toward the operated position thereof, and an unlocked position wherein the cam does not block pivotal movement of the second operating arm.

14. The rotary latch of claim 8, wherein:

a) the first operating arm has a hub formation at a location where the first operating arm connects with the shaft portion, and a first reach of material that extends between the hub formation and the first operating formation; and, b) the second operating arm has a second reach of material that extends between the second pivot axis and the second operating formation, wherein the second reach is substantially longer than the first reach.

15. The rotary latch of claim 14 the second reach includes a generally C-shaped region of material that wraps about the hub formation of the first operating arm to position the second operating formation to engage the first operating formation at a location on the opposite side of the first pivot axis from the second pivot axis.

16. The rotary latch of claim 15 wherein the C-shaped region of material is configured to engage the hub formation when the second operating arm is in the non-operated position of the second operating arm.

17. A flush-mountable, T-handle operated, rotary latch, comprising:

a) a pan-shaped housing defining a forwardly facing recess with a rear portion of the recess being closed by a back wall having a substantially flat main back wall portion extending in an imaginary first plane, and having a back wall opening formed centrally therethrough;

b) a rotary latch assembly including a latch assembly housing that is connected to the pan-shaped housing by at least a substantially flat tab-like formation of the latch assembly housing that extends in a second imaginary plane located just behind the main back wall portion and extending substantially parallel to the first imaginary plane, with the tab-like formation being directly rigidly connected to the main back wall portion of the pan-shaped housing;

c) a T-handle that can be pivoted between non-operated and operated positions of the T-handle about a first pivot axis that is defined by a shaft portion of the T-handle that projects through the back wall opening;

d) first and second operating arms that extend in the second plane and closely overlie the main back wall portion, wherein the first and second operating arms pivot independently alongside the main back wall portion and cooperate to drivingly connect the T-handle to the rotary latch assembly, wherein the first operating arm is connected to the T-handle for pivotal movement therewith about a first pivot axis between non-operated and operated positions of the first operating arm, and the second operating arm is connected to the rotary latch for pivotal movement about a second pivot axis between non-operated and operated positions of the second operating arm for operating the latch when the second operating arm is engaged and moved by the first operating arm as a result of the T-handle being pivoted from the non-operated position of the T-handle to the operated position of the T-handle; and, e) with the tab-like formation of the rotary latch assembly and the first operating arm being configured to engage in the second plane when the first operating arm pivots in a return direction of pivotal movement to the non-operated position of the first operating arm so as to stop return direction pivotal movement of the first operating arm at the non-operated position of the first operating arm, and to thereby concurrently stop the T-handle at the non-operated position of the T-handle.

18. The rotary latch of claim 17 additionally including biasing means for biasing the first and second operating arms and the T-handle toward their respective non-operated positions.

19. The rotary latch of claim 17 wherein the first operating arm pivots through a greater range of angular movement in pivoting between the non-operated and operated positions of the first operating arm than is executed by the second operating arm when pivoting between the non-operated and operated positions of the second operating arm.

20. The rotary latch of claim 17 additionally including a key-operated lock assembly connected to the pan-shaped housing and having a cam that is movable between a locked position wherein the cam extends into a path of movement followed by the second operating arm in moving from the non-operated position of the second operating arm to the operated position of the second operating arm for blocking movement of the second operating arm toward the operated position thereof, and an unlocked position wherein the cam does not block pivotal movement of the second operating arm.

21. The rotary latch of claim 17, wherein:

a) the first operating arm has a hub formation at a location where the first operating arm connects with the shaft portion, and a first reach of material that extends in the second plane closely alongside the main back wall portion between the hub formation and the first operating formation; and, b) the second operating arm has a second reach of material that extends in the second plane closely alongside the main back wall portion between the second pivot axis and the second operating formation, wherein the second reach is substantially longer than the first reach.

22. The rotary latch of claim 21 the second reach includes a generally C-shaped region of material that wraps about the hub formation of the first operating arm to position the second operating formation to engage the first operating formation at a location on an opposite side of the first pivot axis from the second pivot axis.

23. The rotary latch of claim 22 wherein the C-shaped region of material is configured to engage the hub formation when the second operating arm is in the non-operated position of the second operating arm.

24. A flush-mountable, handle-operable rotary latch mountable as a unit on a closure for releasably retaining the closure in a closed position by latchingly engaging a suitably configured strike formation that is located within relatively close proximity to the rotary latch when the closure is in the closed position of the closure, comprising:

a) a flush-mountable handle and housing assembly including:

i) a one-piece, flush-mountable, pan-shaped housing for mounting on a closure, with the pan-shaped housing having back and side wall portions that cooperate to define a forwardly facing recess, with the pan-shaped housing also having a substantially flat mounting flange that extends in an uninterrupted manner about a front perimeter of the recess, with a main back wall portion being substantially flat and extending in a first imaginary plane that generally parallels a front plane in which the mounting flange extends, and with a back wall opening formed through the main back wall portion;

ii) a T-shaped operating handle configured to be nestable within the recess at a location on the front side of the main back wall portion and being pivotal to an extended position for being rotated, while in the extended position, about a first pivot axis between non-operated and operated positions of the T-shaped operating handle, wherein the first pivot axis extends centrally along a shaft portion of the T-shaped operating handle that extends through the back wall opening;

b) a rotary latch assembly rigidly connected to the pan-shaped housing, including a rotary latch housing that has:

i) a one-piece, elongate, generally rectangular first housing side plate having opposed end regions near opposite ends of the length thereof, having a first side surface that extends lengthwise between the opposed end regions, and defining a first U-shaped notch that opens through the first side surface at a location near one of the opposed end regions of the first housing side plate;

ii) a one piece, elongate, generally rectangular second housing side plate having opposed end regions near opposite ends of the length thereof, having a second side surface that extends lengthwise between the opposed end regions, and defining a second U-shaped notch that opens through the second side surface at a location near one of the opposed end regions of the second housing side plate, with the first and second side surfaces extending in spaced, substantially parallel relationship, and with the second U-shaped notch being substantially aligned with the first U-shaped notch;

iii) spacer means for extending transversely between, for rigidly connecting with, and for maintaining a substantially parallel relationship between the first and second housing side plates, with the spacer means including a first spacer that extends along a first transverse axis that intersects each of the first and second housing side plates at a location that is relatively near to the other end regions thereof, and with the spacer means also including a second spacer that extends along a second transverse axis that intersects each of the first and second housing side plates at a location that is substantially mid-way between the opposite ends thereof;

c) means for rigidly connecting the rotary latch housing to the pan-shaped housing, including at least one substantially flat tab-like formation formed integrally with a chosen one of the first and second housing side plates, wherein the tab-like formation extends in a second imaginary plane located just behind the main back wall portion and extending substantially parallel to the first imaginary plane, with the tab-like formation being directly rigidly connected to the main back wall portion of the pan-shaped housing;

d) with the rotary latch assembly additionally including a rotary jaw and a rotary pawl that extend substantially within a common plane located between the first and second housing side plates, with the rotary jaw being connected to the second spacer and being rotatable through a limited range of angular movement about the second transverse axis between latched and unlatched positions but being spring-biased toward the unlatched position of the rotary jaw, with the rotary pawl being connected to the first spacer and being movable relative to the rotary latch housing about the first transverse axis between jaw-retaining and jaw-releasing positions to selectively release and retain the rotary jaw in the latched position of the rotary jaw but being spring-biased to move the rotary pawl toward the jaw-retaining position of the rotary jaw as the rotary jaw moves to the latched position of the rotary jaw, with the rotary jaw defining a third U-shaped notch that is configured to cooperate with the first and second U-shaped notches to concurrently receive and to latchingly retain within the confines of the first, second and third U-shaped notches a suitably configured strike formation when the rotary latch assembly latchingly engages the strike formation;

e) a first operating arm connected to the shaft portion of the T-shaped operating handle and being rotatable therewith about the first pivot axis between non-operated and operated positions of the first operating arm when the T-shaped operating handle pivots about the first pivot axis between the non-operated and operated positions of the T-shaped operating handle, wherein the first operating arm extends in the second plane so as to closely overlie and extend alongside the main back wall portion of the pan shaped housing;

f) a second operating arm having a substantially flat portion thereof extending in the second plane and being connected to the main back wall portion for pivotal movement closely alongside the rear of the main back wall portion between non-operated and operated positions of the second operating about a second pivot axis spaced from and located to one side of the first pivot axis, with the second operating arm defining three spaced formations, with a first of the three formations being located to one side of the second pivot axis and being engageable with the first operating arm for causing the second operating arm to pivot about the second pivot axis from the non-operated position of the second operating arm to the operated position of the second operating arm in response to pivotal movement of the first operating arm about the first pivot axis from the non-operated position of the first operating arm to the operated position of the first operating arm, with a second of the three formations being located generally on the opposite of the second pivot axis and being movable to operate the rotary latch assembly by moving the rotary pawl to release the rotary jaw from the latched position of the rotary law in response to movement of the second operating arm from the non-operated position of the second operating arm to the operated position of the second operating arm, and with a third of the three formations being spaced from the first and second of the three formations and being movable along a path of travel in response to movement of the second operating arm between the non-operated and operated positions of the rotary law; and, g) locking means for being connected to the pan-shaped housing and for providing a locking member that is movable into and out of said path of travel to selectively block and permit movement of the second operating arm between its non-operated and operated positions.

25. The rotary latch of claim 24 wherein said locking means is a key-operated lock that has a quarter-turn cam that defines said locking member.

26. The rotary latch of claim 24 wherein the tab-like formation is engaged by the first operating arm when the first operating arm is in the non-operated position of the first operating arm.

27. The rotary latch of claim 26 additionally including means for biasing the second operating arm into engagement with the first operating arm at least during pivotal movement of the second operating arm between the non-operated and operated positions of the second operating arm.

28. The rotary latch of claim 24, wherein:

a) the first operating arm has a hub formation at a location where the first operating arm connects with the shaft portion, and a first reach of material that extends in the second plane closely alongside the main back wall portion between the hub formation and the first operating formation; and, b) the second operating arm has a second reach of material that extends in the second plane closely alongside the main back wall portion between the second pivot axis and the second operating formation, wherein the second reach is substantially longer than the first reach.

29. The rotary latch of claim 28 the second reach includes a generally C-shaped region of material that wraps about the hub formation of the first operating arm to position the second operating formation to engage the first operating formation at a location on the opposite side of the first pivot axis from the second pivot axis.

30. The rotary latch of claim 29 wherein the C-shaped region of material is configured to engage the hub formation when the second operating arm is in the non-operated position of the second operating arm.

* * * * *

UNITED STATES PATENT AND TRADEMARK OFFICE

CERTIFICATE OF CORRECTION

PATENT NO. : 6,651,467 B1
DATED : November 25, 2003
INVENTOR(S) : Weinerman et al.

It is certified that error appears in the above-identified patent and that said Letters Patent is hereby corrected as shown below:

Title page,
Item [57], ABSTRACT,
Line 3, delete "."

Column 11,
Line 14, delete "."

Column 13,
Line 42, delete "1001" and substitute -- 100 --

Column 14,
Lines 33 and 57, delete "."
Line 44, delete "="

Column 17,
Line 33, delete "lust" and substitute -- just --

Column 19,
Line 52, delete "By"
Line 55, delete the second occurrence of "to"

Column 24,
Line 18, delete "law" and substitute -- jaw --

Signed and Sealed this

Twenty-fifth Day of January, 2005

JON W. DUDAS
*Director of the United States Patent and Trademark Office*